US012283387B2

(12) United States Patent
Harvey et al.

(10) Patent No.: US 12,283,387 B2
(45) Date of Patent: Apr. 22, 2025

(54) METHOD AND SYSTEM FOR PRODUCING ISOTOPES

(71) Applicant: NorthStar Medical Radioisotopes, LLC, Beloit, WI (US)

(72) Inventors: James T. Harvey, Naperville, IL (US); Rimas S. Milunas, Madison, WI (US); Daniel E. Peltier, Sun Prairie, WI (US); Sarah M. Burns, Madison, WI (US); James L. McCarter, Waunakee, WI (US); Tomas A. Montenegro, Madison, WI (US); Jason M. Schlough, Madison, WI (US); Maxwell J. Brennan, Madison, WI (US); Quintin G. Schiller, Madison, WI (US)

(73) Assignee: Northstar Medical Technologies, LLC, Beloit, WI (US)

( * ) Notice: Subject to any disclaimer, the term of this patent is extended or adjusted under 35 U.S.C. 154(b) by 214 days.

(21) Appl. No.: 17/404,782

(22) Filed: Aug. 17, 2021

(65) Prior Publication Data

US 2022/0084707 A1 Mar. 17, 2022

Related U.S. Application Data

(60) Provisional application No. 63/086,488, filed on Oct. 1, 2020, provisional application No. 63/066,897, filed on Aug. 18, 2020.

(51) Int. Cl.
*G21G 1/10* (2006.01)
*G21G 1/12* (2006.01)
(Continued)

(52) U.S. Cl.
CPC ................ *G21G 1/10* (2013.01); *G21G 1/12* (2013.01); *G21K 5/04* (2013.01); *G21K 5/08* (2013.01);
(Continued)

(58) Field of Classification Search
CPC ... G21C 1/10; G21C 1/12; G21K 5/08; H05H 7/001; H05H 7/06; H05H 2277/116; H05H 2007/007; H05H 2007/045
See application file for complete search history.

(56) References Cited

U.S. PATENT DOCUMENTS

| | | |
|---|---|---|
| 4,401,618 A | 8/1983 | Salisbury |
| 7,902,530 B1 | 3/2011 | Sahadevan |

(Continued)

FOREIGN PATENT DOCUMENTS

| | | |
|---|---|---|
| CN | 110853792 A | 2/2020 |
| CN | 111724926 A | 9/2020 |

(Continued)

OTHER PUBLICATIONS

Kleeven, Willem, et al. "Design and Simulation Tools for the High-Intensity Industrial Rhodotron Electron Accelerator." 9th Int. Particle Accelerator Conf.(IPAC'18), Vancouver, BC, Canada, Apr. 29-May 4, 2018. JACOW Publishing, Geneva, Switzerland, 2018. (Year: 2018).*

(Continued)

*Primary Examiner* — Sharon M Davis
(74) *Attorney, Agent, or Firm* — Husch Blackwell LLP

(57) ABSTRACT

A system and method for producing radioisotopes such as molybdenum-99. The system comprises a first accelerator, a second accelerator, a first beamline, a second beamline, and a target. Using a pair of accelerators, beamlines are preferably fired at a target from opposite directions, thereby irradiating the target from both sides. The system can further comprise a target cooling system utilizing gaseous helium, a modular local target shielding comprised of boxes of either metal shot with liquid coolant or steel with concrete, and a hot cell for loading and unloading target disks.

18 Claims, 25 Drawing Sheets

(51) Int. Cl.
*G21K 5/04* (2006.01)
*G21K 5/08* (2006.01)
*H05H 6/00* (2006.01)

(52) U.S. Cl.
CPC ......... *H05H 6/00* (2013.01); *H05H 2277/116* (2013.01)

(56) References Cited

U.S. PATENT DOCUMENTS

| | | | | |
|---|---|---|---|---|
| 9,129,714 | B2 | 9/2015 | Noonan et al. | |
| 2005/0242276 | A1* | 11/2005 | Okazaki | G21G 1/10 250/251 |
| 2006/0017411 | A1* | 1/2006 | Hamm | G21G 1/00 315/505 |
| 2006/0065855 | A1 | 3/2006 | Kakiuchi et al. | |
| 2013/0301769 | A1* | 11/2013 | Schaffer | B22F 1/145 376/195 |
| 2017/0337997 | A1 | 11/2017 | Woloshun et al. | |
| 2020/0066418 | A1* | 2/2020 | Rotsch | G21K 5/08 |
| 2020/0077506 | A1* | 3/2020 | Sheh | G21G 1/10 |

FOREIGN PATENT DOCUMENTS

| | | | | |
|---|---|---|---|---|
| WO | 2008138998 | A1 | 11/2008 | |
| WO | WO-2017076961 | A1 * | 5/2017 | G21G 1/10 |

OTHER PUBLICATIONS

International Search Report and Written Opinion for International Application No. PCT/21/46352 dated Dec. 9, 2021.

Extended European Search Report re application No. EP 21858992.7, dated Jul. 19, 2024.

* cited by examiner

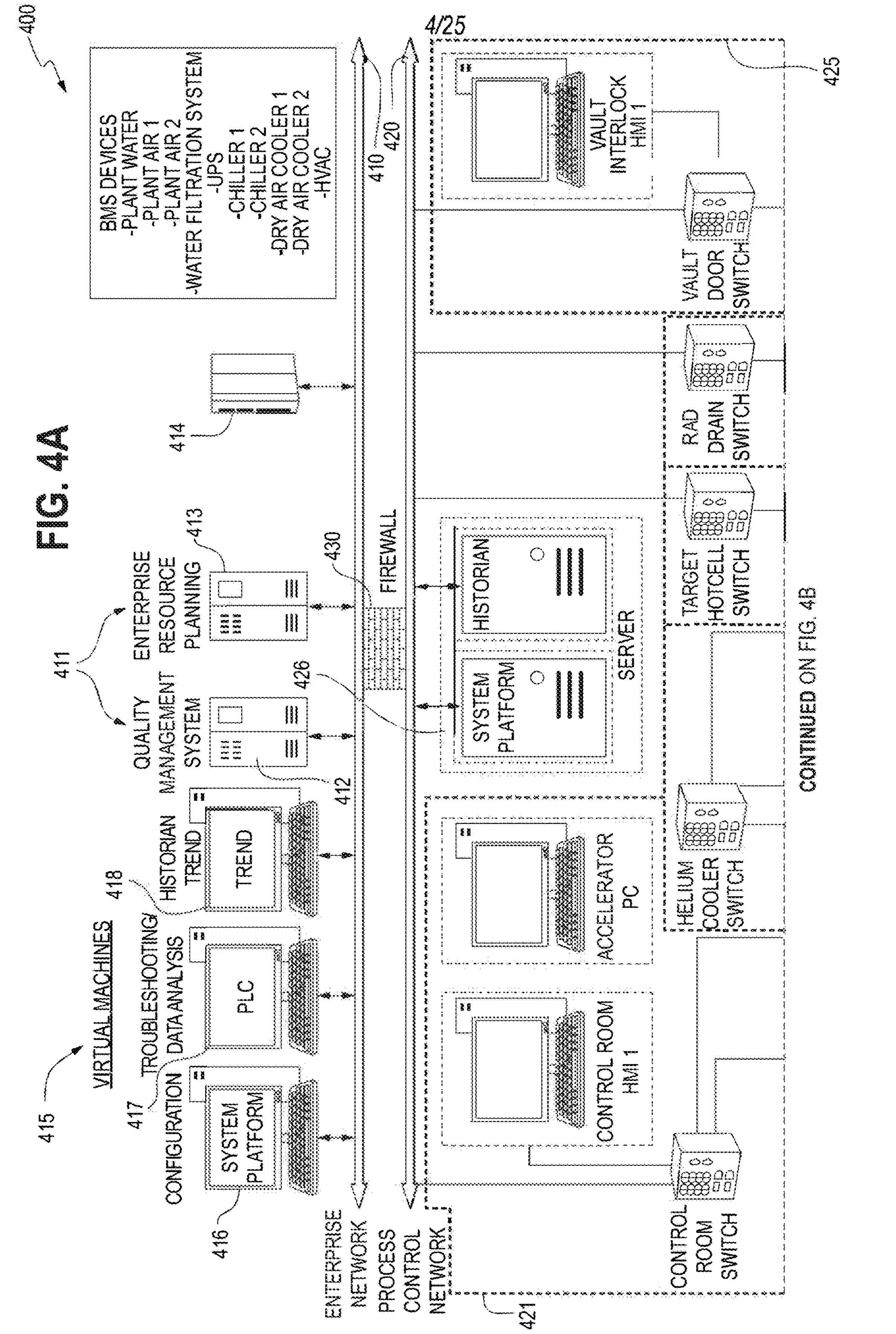
FIG. 4A
400
BMS DEVICES
-PLANT WATER
-PLANT AIR 1
-PLANT AIR 2
-WATER FILTRATION SYSTEM
-UPS
-CHILLER 1
-CHILLER 2
-DRY AIR COOLER 1
-DRY AIR COOLER 2
-HVAC
415
VIRTUAL MACHINES
416
SYSTEM PLATFORM
CONFIGURATION
417
PLC
TROUBLESHOOTING/ DATA ANALYSIS
418
TREND
HISTORIAN TREND
411
QUALITY MANAGEMENT SYSTEM
412
ENTERPRISE RESOURCE PLANNING
413
414
410
420
430
FIREWALL
426
SYSTEM PLATFORM
HISTORIAN
SERVER
ENTERPRISE NETWORK
PROCESS CONTROL NETWORK
421
CONTROL ROOM HMI 1
ACCELERATOR PC
CONTROL ROOM SWITCH
HELIUM COOLER SWITCH
TARGET HOTCELL SWITCH
RAD DRAIN SWITCH
VAULT DOOR SWITCH
VAULT INTERLOCK HMI 1
425
4/25
CONTINUED ON FIG. 4B FIG. 4B
CONTINUED FROM FIG. 4A
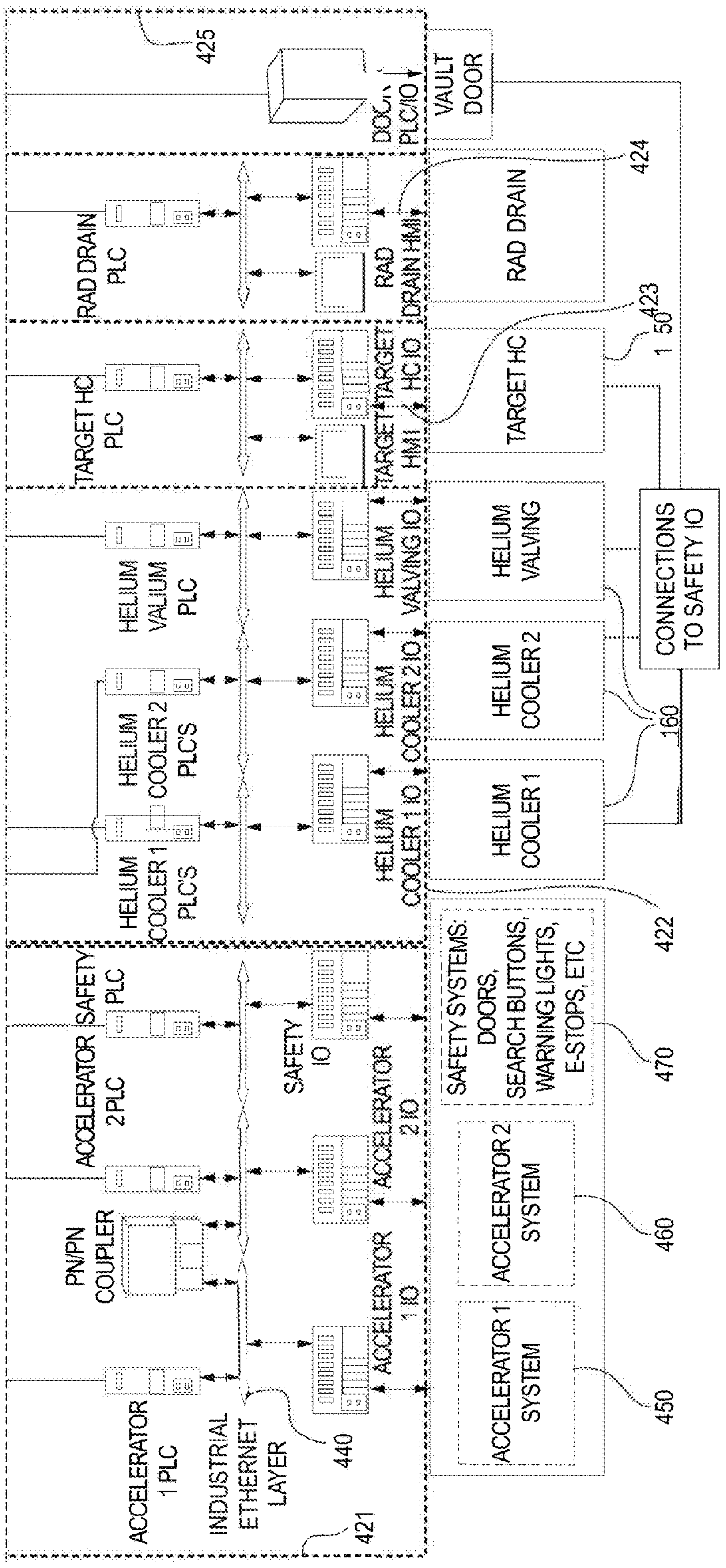

METHOD AND SYSTEM FOR PRODUCING ISOTOPES

CROSS-REFERENCE TO RELATED APPLICATION

This application claims the benefit of the filing date of U.S. Provisional Application Ser. No. 63/066,897 filed Aug. 18, 2020, entitled, "Method and System for Producing Molybdenum-99" and U.S. Provisional Application Ser. No. 63/086,488 filed on Oct. 1, 2020, entitled "Method and System for Producing Molybdenum-99", both of which are hereby incorporated by reference as if fully set forth herein.

BACKGROUND OF THE INVENTION

Radioactive isotopes are widely used in medicine and life sciences. The utility and commercial value of a radioisotope are in part determined based upon specific activity, with a high specific activity having greater utility and value.

Man-made isotopes are typically produced by methods using electron beams, ion beams, and nuclear reactors. Electron beams are generally used to produce short-lived isotopes at locations near the site of use. Ion beams and reactors are generally used to produce longer-lived isotopes at central facilities.

Many isotopes are amenable to production by all three techniques. These include isotopes prepared by either the addition or removal of a neutron from a naturally-occurring targeted isotope.

An ion beam process has been the method of choice for neutron removal because of its relatively high energy efficiency. However, the ion beam process is disadvantaged by its high initial cost, complexity of operation, and limited ability to be scaled to large production rates. In addition, the relatively heavy mass of the ions makes it very difficult to generate high current density beams. Furthermore, because the ion energy is deposited in a very short distance, thus causing intense local target heating, the beam cannot be sharply focused without destroying the target. These factors limit the average specific activity achievable by ion beams and limit quantity and quality of production.

An electron beam has significantly longer stopping distances than does an ion beam. However, the electron beam must generate photons within or near the target before the radioisotope can be formed. Further, high electron beam power density, which is required to generate the photon intensity needed to produce a high specific activity of radioisotope, typically imposes unacceptably high heat loads upon a target material, resulting in target melting. This again limits quantity and quality of production.

Fission reactors compete with the beam sources in the production of isotopes through neutron absorption processes and have a unique role in the production of isotopes separated from fission products. Fission reactors are currently the method of choice for neutron addition because of their ability to produce large quantities of product.

Molybdenum-99 (Mo-99 or aMO) is a key medical isotope used to produce technetium-99m (Tc-99m) that is used in about 80 percent of medical imaging, or about 50,000 times per day, in the United States.

Today, the majority of Mo-99 supplies used in the industry are created through fission reactors. Using neutron capture, molybdenum-98 (Mo-98), which is a majority isotopic contributor present in naturally-occurring molybdenum (nMO), is bombarded by neutrons, which creates Mo-99. NorthStar Medical Radioisotopes, LLC, the first United States supplier since the 1980s to be FDA approved for the production of Mo-99, currently produces Mo-99 using neutron capture in partnership with the University of Missouri Research Reactor.

There are, however, numerous disadvantages with using a nuclear reactor to create medical isotopes. Nuclear reactors are extremely expensive, have very high operating costs, and are subject to exceedingly stringent siting and operational constraints under Federal regulations. Therefore, there is a continuous need for a less expensive means for producing Mo-99 without the need of nuclear reactors.

Alternatively, production of Mo-99 using neutron ejection was studied by Lidsky et al. at the Massachusetts Institute of Technology in the 1990s. U.S. Pat. No. 5,784,423 ("Lidsky"), titled "Method of Producing Molybdenum-99", the content of which is hereby incorporated by reference in its entirety, discloses a method of producing Mo-99 using a single electron accelerator.

Although the method described in Lidsky eliminates the reliance on nuclear reactors in the production of Mo-99, it is also disadvantaged for several reasons. For example, relying on one single accelerator results in interruptions in production during downtimes for maintenance. In addition, backstreaming radiation caused by the electron beam can cause serious damages to devices in an accelerator target region. These technical challenges render commercial production of Mo-99 using an electron accelerator elusive. Therefore, there is a continuous need to increase the production rate of Mo-99 and to minimize backstreaming radiation.

There is also a need for uninterrupted production of man-made Mo-99 and other medically-useful radioisotopes in the event that an accelerator needs to be shut down for maintenance.

BRIEF SUMMARY OF THE INVENTION

This disclosure generally relates to a method and system of producing a product isotope from a target isotope by irradiating the target isotope from opposite sides using a pair of electron accelerators. Illustratively, a Mo-100 target is irradiated with energetic electrons to create high energy x-rays from opposite directions to maximize product isotope Mo-99 yield rate and also minimize backstreaming radiation.

In an exemplary embodiment, a system for producing radioisotope can include a first electron accelerator configured to engage a first beamline and a second electron accelerator configured to engage a second beamline. The system can further include a target assembly configured to house a target isotope to be transmuted into a product isotope, wherein the first beamline engages the target assembly from a first direction and the second beamline engages the target assembly from a second direction. More particularly, the target isotope can be molybdenum-100, and the product isotope can be molybdenum-99. The system can also include a hot cell connected to the target assembly and a target cooling system configured to engage the target assembly. Specifically, the target assembly can include a target housing that engages a first cooling pipe at a proximal end and a second cooling pipe at a distal end, forming a trident shape.

In another exemplary embodiment, a method for producing radioisotopes can include producing a first beamline from a first electron accelerator, producing a second beamline from a second electron accelerator, converging the first beamline and the second beamline onto a target assembly, irradiating the target assembly by the first beamline and the second beamline, and in response to the target assembly being irradiated by the first beamline and the second beamline, transmuting a target isotope into a product isotope. More particularly, the target isotope can be molybdenum-100, and the product isotope can be molybdenum-99. Specifically, the first beamline can converge onto the target assembly from a first direction, and the second beamline can converge onto the target assembly from a second direction opposite from the first direction.

In yet another exemplary embodiment, a system for producing molybdenum-99 can include a first electron accelerator configured to engage a first beamline, a second electron accelerator configured to engage a second beamline, and a target assembly configured to house the target holder that carries molybdenum-100 to be transmuted into molybdenum-99. The first beamline can engage the target assembly from a first direction and the second beamline can engage the target assembly from a second direction opposite from the first direction. Moreover, a target cooling system can be configured to supply gaseous helium to the target assembly and a hot cell can be configured to engage the target assembly for loading and unloading a target holder.

BRIEF DESCRIPTION OF THE DRAWINGS

FIG. 4A illustrates a first portion of a network architecture of a control system according to an exemplary embodiment and FIG. 4B illustrates a second portion;

Figure 1:
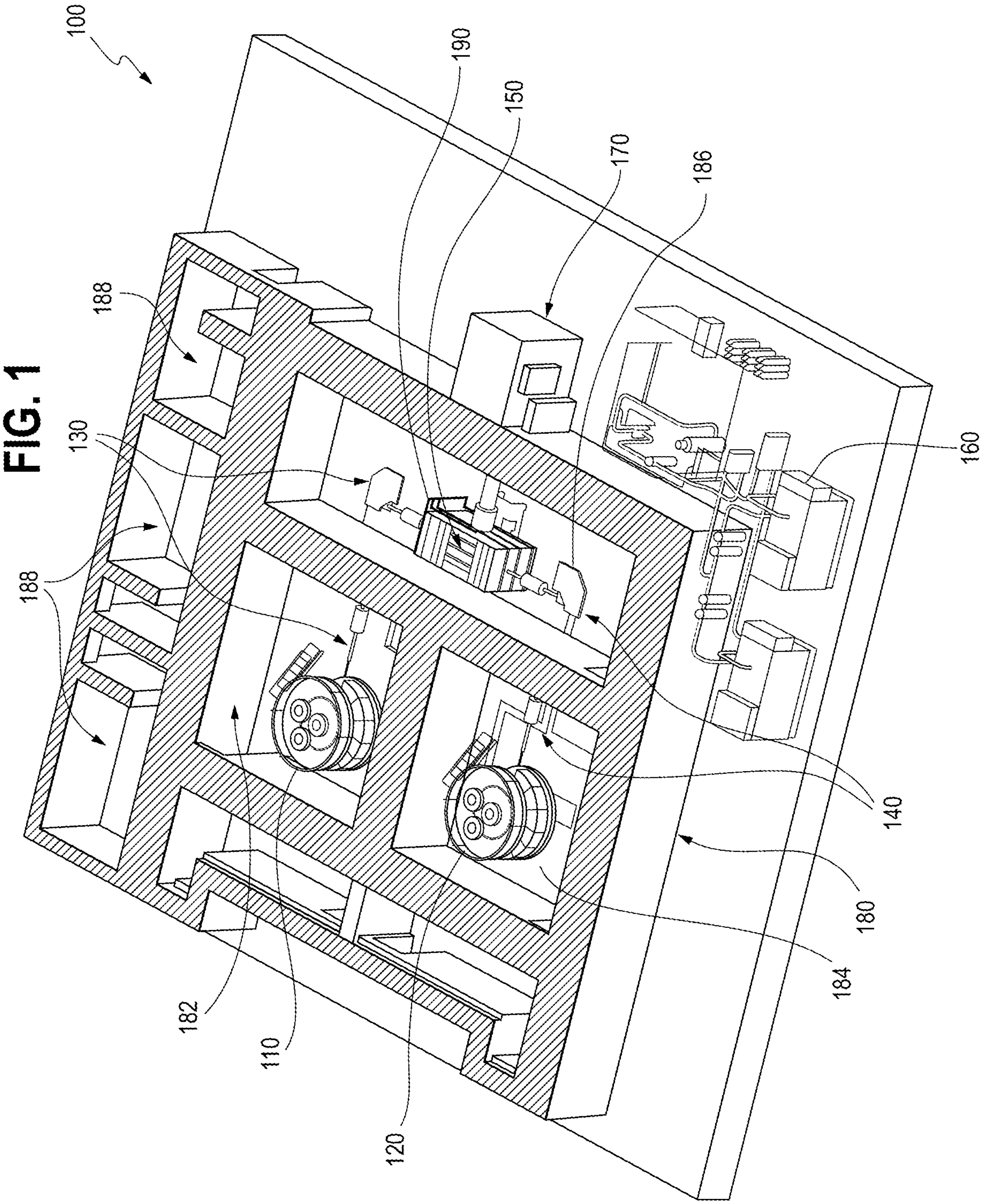
FIG. 1 illustrates a perspective view of a system for producing isotopes, such as Mo-99, according to an exemplary embodiment.

Before explaining the disclosed embodiment of the present invention in detail, it is to be understood that the invention is not limited in its application to the details of the particular arrangement shown, because the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Although this invention is susceptible of embodiments in many different forms, there are shown in the drawings and are described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in desired combinations, for the operation of the invention in its various embodiments. Features from one embodiment can be used in other embodiments of the invention.

Further, although the method and system described herein generally relate to the production of a product isotope (such as Mo-99) using a target isotope (such as Mo-100), it is to be appreciated that other radioisotopes, including but not limited to, Cu-67 using a Zn-68 target, Sc-47 using a Ti-48 target, Ac-225 using a Ra-226 target, or Re-186 using an Os-187 target, can also be produced using the method and system described herein. Thus, descriptions of embodiments using molybdenum are not meant to preclude other isotopes. It can be appreciated that the system and method described herein constitute an improvement over all known system by providing numerous benefits, including allowing an uninterrupted production of radioisotopes even in the event that one of the accelerators is shut down for maintenance.

It is to be noted that greater yields of the desired product isotope can be achieved by use of artificially-enriched concentrations of the target isotope. For example, one can use an amount of Mo-100 that ranges from the naturally abundant amount (about 9.7%) to about 95% Mo-100 as the target. When 95% Mo-100 is used, the yield of Mo-99 increases about ten-fold. Thus, where multiple stable isotopes (e.g., half life greater than 100 years with less than 1% loss) exist, it is preferred to utilize a target isotope having an enhanced amount of the desired target isotope.

Conventionally, a neutron removal process for producing an isotope, and particularly a radioisotope, involves firing a linear electron accelerator (linac) at a target along a common axis. However, the conventional method results in a low yield rate of the desired isotope and creates backstreaming radiation that is harmful to equipment downrange from the beamline. Thus, to maximize production efficiency and to avoid backstreaming radiation, according to an exemplary embodiment, an enriched target is to be radiated from both sides, i.e., from opposite directions, using a pair of electron accelerators.

Referring to FIG. 1, an exemplary system 100 for producing an isotope, particularly Mo-99, is shown. Specifically, the system 100 to produce the isotope can comprise a first accelerator 110 and a second accelerator 120 respectively connected to a first beamline 130 and a second beamline 140. The first beamline 130 and the second beamline 140 can converge on a target holder 150 from opposite directions. The target holder 150 can be an apparatus where a target isotope (such as enriched Mo-100) is held for irradiation. The target holder 150 can further engage with a target cooling system 160 (also known as a process cooling system) and a hot cell 170.

The first accelerator 110 and the second accelerator 120 together with the first beamline 130 and the second beamline 140 can be shielded within an accelerator vault 180. In the exemplary embodiment, the accelerator vault 180 can further be separated into a first radiation zone 182 that houses the first accelerator 110 and a first portion of the first beamline 130 therein, a second radiation zone 184 that houses the second accelerator 120 and a first portion of the second beamline 140 therein, and a third radiation zone 186 that houses the target holder 150 together with a second portion of the first beamline 130 and a second portion of the second beamline 140. The separate radiation zones can ensure that maintenance can be performed on one component of the system 100 while the remaining components remain operational. For example, a technician can be servicing the first accelerator 110 within the first radiational zone 182 without impacting an operation of the second accelerator 120 that is located within the second radiation zone 184.

A region proximal to the target holder 150 can further be shielded by a local target shielding 190. One or more water skids (not shown) can be provided to cool the first beamline 130 and/or the second beamline 140. Each water skid can include valves and pumps mounted on a common carrier. Given that the water skids can be radioactive, the system 100 can also include one or more shielded water skid rooms 188 used to house the water skids therein.

In an exemplary embodiment, the accelerator vault 180 together with the interior walls used to form the radiation zones 182, 184, and 186 and the water skid rooms 188 can be constructed out of high density (HD) concrete blocks, supplied by Veritas Medical Solutions, Harleysville, PA, USA. HD concrete is better per unit volume at shielding gamma rays, which are the primary source of prompt radiation created in the process, than regular density concrete. Specifically, prompt radiation refers to radiation emitted instantaneously during an operation of the accelerators, which is different from residual or induced radiation caused by activated components in the vaults or the beamlines. Although other materials such as steel or lead can also be used for the accelerator vault, these materials are more expensive, and are not as efficient in stopping prompt neutrons, which are also produced during the process, as HD concrete.

The first accelerator 110 and the second accelerator 120 are used to generate accelerated electrons to irradiate Mo-100 held in the target holder 150. In an exemplary embodiment, the first accelerator 110 and the second accelerator 120 are electron accelerators capable of supplying 125 kW of average power with 40 MeV electrons. In another embodiment, the first accelerator 110 and the second accelerator 120 can generate at least 20 MeV electrons. However, it can be appreciated that the first accelerator 110 and the second accelerator 120 can supply power less than 125 kW and can certainly generate energies less than 40 MeV depending on levels of productions and specific embodiments.

In an exemplary embodiment, the target isotope (such as Mo-100) can act as both a Bremsstrahlung converter and as the target material, in which the gamma rays created by the impact of the electron beam with the target isotope then interact with the target isotope to create the product isotope (such as Mo-99) through a gamma-n reaction. Thus, eliminating a need for a conventional Bremsstrahlung converter.

According to an exemplary embodiment, a pair of RHODOTRON® electron beam (E-beam) accelerators, produced by IBA Industrial, Louvain-La-Neuve, Belgium, can be used as the first accelerator 110 or the second accelerator 120. Unlike a conventional linear accelerator (linac), a RHODOTRON® E-beam accelerator is a continuous wave electron beam accelerator combining high-power and high energy. The high-power high-energy property of a RHODOTRON® E-beam accelerator helps to improve the production efficiency of Mo-99, previously unattainable using a linac. Moreover, a RHODOTRON® E-beam accelerator is more compact in size, allowing the dual accelerator setup to take up less square footage in an isotope production facility.

Figure 2:
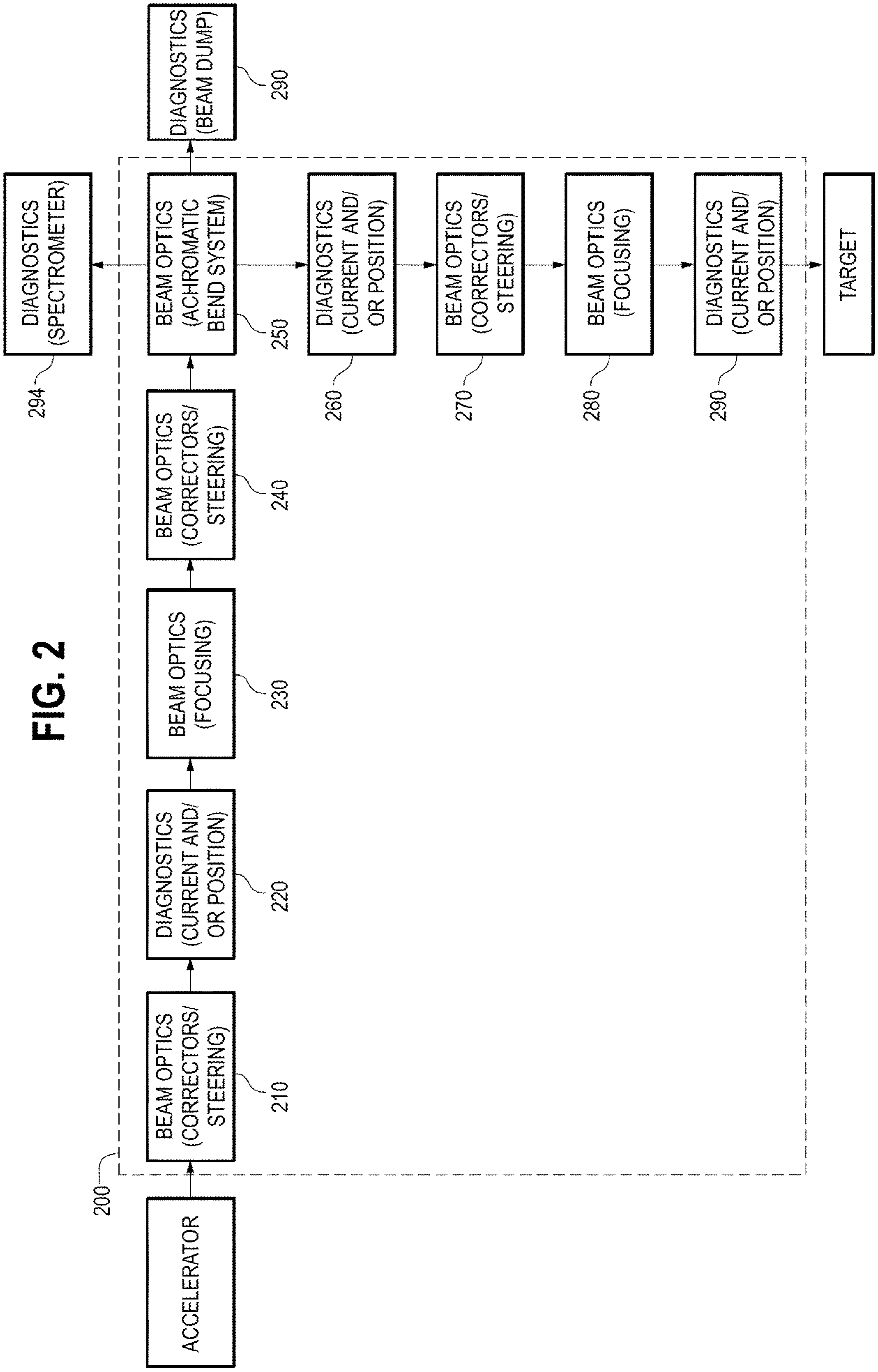
FIG. 2 illustrates block diagram of a beamline according to an exemplary embodiment.

In order to irradiate the target holder 150 from opposite directions, specialized beamlines (as shown in FIG. 2) can be used to bend a respective electron beam at an angle toward the target holder 150. In an exemplary embodiment, the beamlines 130, 140 bend the electron beams by 90 degrees toward the target holder 150. The invention is not limited to 90 degrees but can include other angles to result in beamlines irradiating target from different directions or degrees. As a result, the target holder 150 is not placed on a common axis with one of the accelerators 110 or 120. Instead, in an exemplary embodiment, the first accelerator 110 and the second accelerator 120 are offset from the target holder 150 as shown in FIG. 1.

In operation, the first beamline 130 and the second beamline 140 can accept the electron beam from the first accelerator 110 and the second accelerator 120 respectively. Then the first beamline 130 and the second beamline 140 can bend the respective beam to hit the target holder 150 from both sides and to avoid backstreaming radiation. After the bend, the first beamline 130 and the second beamline 140 can match the respective beam spot to that desired at the target holder 150, analyze the energy of the respective beam, or pass the respective beam straight through to a waiting beam analyzer and dump.

It can be appreciated that the system 100 can include other variations such as addition or omission of certain components. Such variations are too within the spirit of this disclosure.

FIG. 2 illustrates block diagram of a beamline subsystem 200 that can be used as the first beamline 130 or the second beamline 140. The beamline subsystem 200 can include first beam optics 210 that accepts an electron beam from an accelerator (which can be either the first accelerator 110 or the second accelerator 120 as described above). The first beam optics 210 can be used to correct and steer the electron beam received from the accelerator. The first beam optics 210 can be coupled to a first diagnostic component 220 that can be used to analyze a current or a position of the electron beam. The first diagnostic component 220 can further be coupled with second beam optics 230 used for focusing the electron beam. The second beam optics 230 can be coupled with third beam optics 240 for further correcting and steering the electron beam. Therefrom, the third beam optics 240 can be coupled to fourth beam optics 250 comprising an achromatic bend system. In an exemplary embodiment, to facilitate the bending of the electron beam, a pair of 270° magnets can be used for the achromatic bend system to bend the electron beam.

From the fourth beam optics 250, the electron beam can travel down one of three paths. If the electron beam matches predetermined criteria for production, the electron beam can be bent by the fourth beam optic 250 toward a second diagnostic component 260 for further analysis of the current or the position of the electron beam. The second diagnostic component 260 can be coupled with fifth beam optics 270 for correction and steer, which can further be coupled with sixth beam optics 280 for focusing. The sixth beam optics 280 can be coupled to a third diagnostic component 290 for one last current and position analysis of the electron beam before transporting the electron beam to a target (such as Mo-100 housed in the target holder 150 described above).

Alternatively, if the electron beam does not match the predetermined criteria for production, the fourth beam optics 250 can pass the electron beam to a fourth diagnostic component 292 and to a beam dump or beam stop. Lastly, if the electron beam is not used for production, the fourth beam optics 250 can pass the electron beam to a fifth diagnostic component 294 such as a spectrometer for further analyzing.

In the exemplary embodiment, the electron beam can enter the fourth beam optics 250 and exit the fourth beam optics 250 in substantially the same plane. That is to say, the achromatic bend system of the fourth beam optics 250 does not affect a vertical elevation of the electron beam. However, in other embodiments, the electron beam can exit the fourth beam optics 250 in a different plane than the plane that the electron beam enters the fourth beam optics 250.

It can be appreciated that the beamline subsystem 200 can include other variations such as addition or omission of certain components. Such variations are within the spirit of this disclosure.

Figure 3:
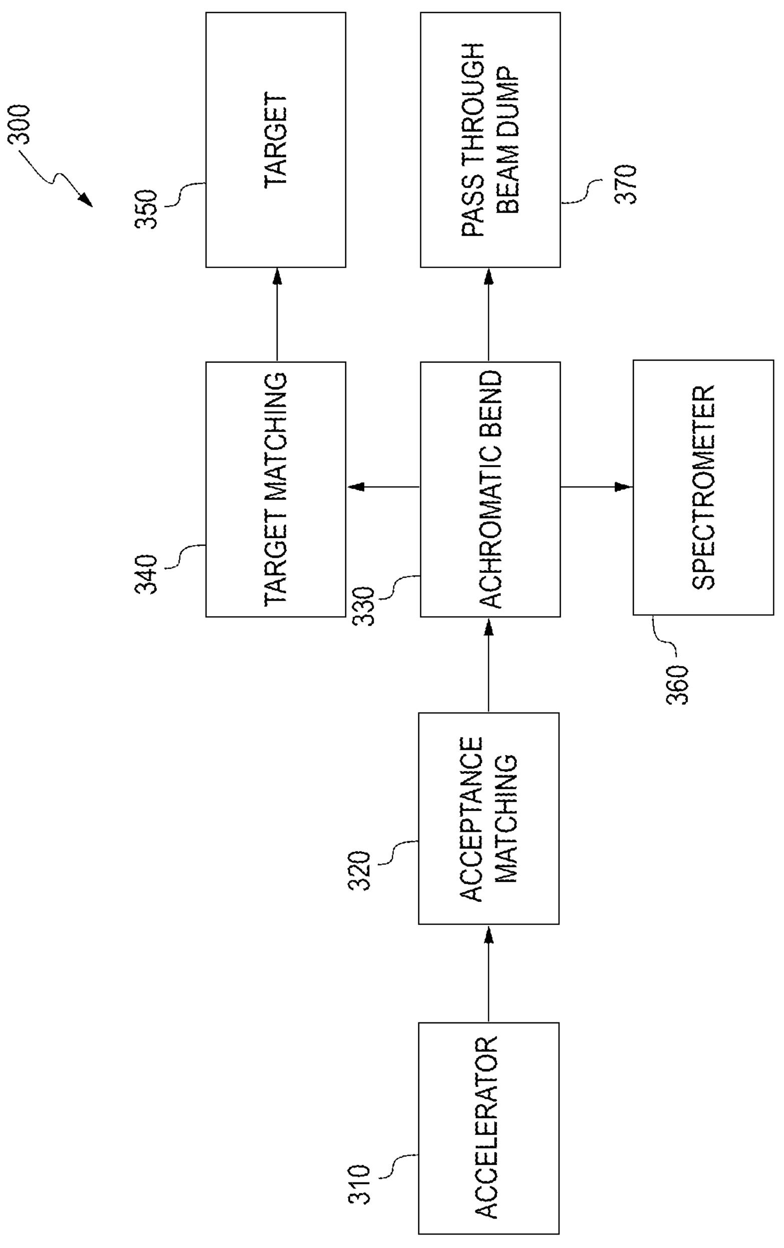
FIG. 3 illustrates a simplified process of transporting an electron beam to a target according to an exemplary embodiment.

FIG. 3 illustrates a simplified process 300 of transporting an electron beam to a target (which can be held within the target holder 150 of FIG. 1) according to an exemplary embodiment. At step 310, an electron beam is generated by an accelerator (such as the accelerators 110 and 120 of FIG. 1). According to an exemplary embodiment, the electron beam can be generated by using a RHODOTRON® E-beam accelerator supplying 125 kW of average power with 40 MeV electrons.

At step 320, the electron beam can be analyzed (such as by the first diagnostic component 220 of FIG. 2) to verify that the energy matches predetermined criteria for production. At step 330, the electron beam can take one of three paths and be bent accordingly. If the electron beam matches the predetermined criteria for production, the electron beam can be bent (such as by the fourth beam optics 250 of FIG. 2) preferably 90° toward the target and be matched with a beam spot at step 340 to that desired at the target before being transported to the target at step 350. Alternatively, if the electron beam is not being used for production, the electron beam can be analyzed at step 360 by passing through a spectrometer (such as the fifth diagnostic component 294 of FIG. 2). If the electron beam does not match the predetermined criteria for production at step 320, the beamline can be passed through at step 370 to a waiting beam analyzer (such as the fourth diagnostic component 292 of FIG. 2) and to a beam dump or beam stop.

It can be appreciated that the process 300 can include other variations such as addition or omission of certain steps. Such variations are within the spirit of this disclosure.

Figure 4C:
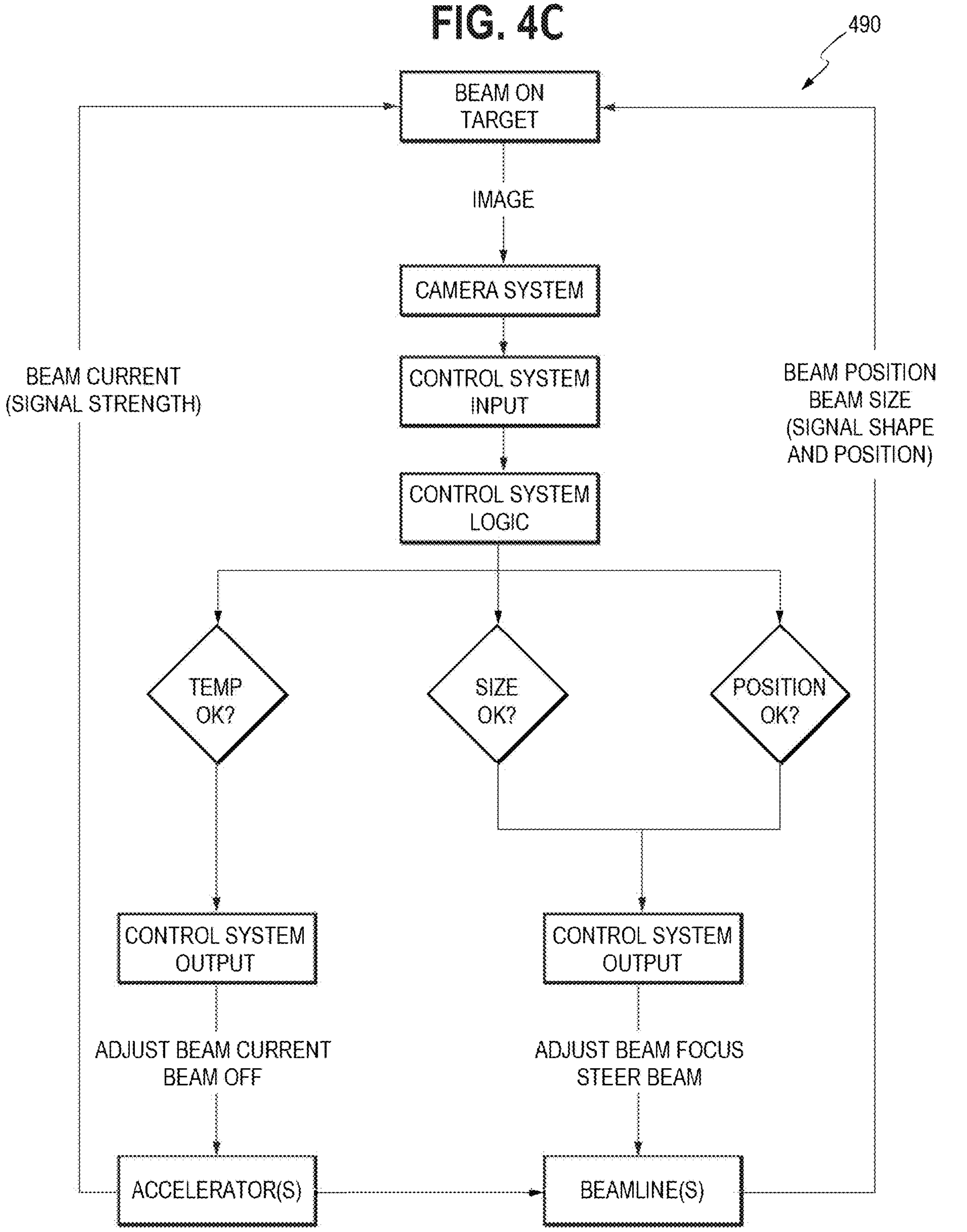
FIG. 4C illustrates an exemplary control diagram of an accelerator control subsystem according to an exemplary embodiment.

FIGS. 4A, 4B, 4C and 4D illustrate a network 400 that can be used to monitor and control a beamline, such as described supra, according to an exemplary embodiment. Referring to FIGS. 4A and 4B, the network 400 can include an enterprise network 410 and a process control network 420 separated by a firewall 430.

The enterprise network 410 can include physical machines 411 and virtual machines 415 that form an intranet for a company. In an exemplary embodiment, the physical machines 411 can include a quality management system 412 and an enterprise resource planning system 413. Further, the virtual machines can include a system for configuration 416, a system for troubleshooting and data analysis 417, and a system for historian trend 418. The enterprise network 410 can further include a building management system 414 (BMS) that can be configured to control various aspect of a plant building. By way of example, the building management system 414 can be configured to control BMS devices, water, air, water filtration, uninterruptible power supply (UPS), chiller, cooler, heating, ventilation, and air conditioning (HVAC), and other systems in the plant building.

The process control network 420 can include several control subsystems to control various aspect of a system for a radioisotope production (such as the system 100 of FIG. 1). In an exemplary embodiment, the process control network 420 can include an accelerator control subsystem 421, a cooler control subsystem 422, a target control subsystem 423, a radiation drain control subsystem 424, a vault door control subsystem 425, and various servers 426. Each control subsystem 421, 422, 423, 424 or 425 can include one or more human-machine interfaces (HMIs), personal computers (PCs), switches, programmable logic controllers (PLCs), and/or network couplers. The respective control subsystems 421, 422, 423, 424 or 425 can further be connected to an industrial ethernet layer 440, which is further connected to the respective input/output (IO) of the system that the respective subsystem is meant to control. In an exemplary embodiment, the industrial ethernet layer 440 can be PROFINET, although other suitable network protocols can also be used. The servers 426 can include a system platform server and a historian server.

Using the accelerator control subsystem 440 as an example, the accelerator control subsystem 440 can include components located within a control room in a production facility (plant). For example, the accelerator control subsystem 440 can include a control room switch that connects the accelerator control subsystem 440 to the process control network 420. Further, the control room switch can be connected to a control room human-machine interface and a PC, enabling operators to control and monitor the accelerators. The control room switch can also be connected to one or more PLCs.

In an exemplary embodiment, one PLC can correspond to one accelerator. For example, a first PLC can be provided for a first accelerator system 450 (which can include the first accelerator 110 and the first beamline 130), and a second PLC can be provided for a second accelerator system 460 (which can include the second accelerator 120 and the second beamline 140). Moreover, a third PLC can be provided for safety systems 470. Safety systems 470 can include many devices, while strictly necessary of a production of radioisotopes, are nonetheless important for health and safety of operators. By way of example, the safety systems 470 can include doors, search buttons, warning lights, emergency stops, and the like.

The PLCs can each be connected to a respective industrial ethernet layer 440 that is further in communication with an input/output (I/O) of the underlying component. For example, the first PLC can be connected to an industrial ethernet layer 440 that is connected to an I/O for the first accelerator system 450. Similarly, the second PLC can be connected to an industrial ethernet layer 440 that is connected to an I/O for the second accelerator system 460, and the third PLC can be connected to an industrial ethernet layer 440 that is connected to an I/O for the safety systems 470. Depending on the embodiments, one or more network couplers (such as a PN/PN coupler) can be provided to connect the several industrial ethernet layers 440. In an embodiment, a PN/PN coupler can be provided to connect the industrial ethernet layer 440 for the first accelerator system 450 with the industrial ethernet layer 440 for the second accelerator system 460. In an exemplary embodiment, the I/O for the safety system 450 can further be connected with the I/O for the first accelerator system 450 and the I/O for the second accelerator system 460.

As shown in FIGS. 4A and 4B, there are many ways to configure a control subsystem, and the configurations provided herein are merely examples. For example, a PLC or an industrial ethernet layer 440 may be omitted from a control subsystem as shown in the vault door control subsystem 425. It is to be appreciated that other configurations of a control subsystem are also within the spirit of this disclosure.

FIG. 4C illustrates an exemplary control diagram 490 of an accelerator control subsystem according to an embodiment. As an accelerator (either the first accelerator 110 or the second accelerator 120) generates an electron beam on the target holder 150, an image (or images) of such beam on target can be captured by a camera system. The camera system can include cameras and lenses, to capture the light, both in the visible and infrared (IR) spectrum, created due to the interaction of the beam with the target window to actively control the accelerator and beamline.

The camera system can then feed data into an input for a control system (such as the accelerator control subsystem 421). The data can then be analyzed by a set of logics (which can be carried out by one of the PLCs or other computers or processors acting as a diagnostic component). Relevant to the accelerator, the control system can analyze whether the temperature of the beam is within an acceptable range or target. Based on such determination, the control system can adjust a beam current (signal strength) or turn off the beam by instructing the accelerator accordingly. For example, an IR camera with view of a target window can be used to shut down the accelerator prior to a failure of the target window if a high temperature were to be detected. Relevant to the beamline, the control system can analyze whether a size (signal shape) or a position of the beam is within an acceptable range or target and instruct the beamline to adjust accordingly.

Furthermore, in addition to monitoring parameters pertaining to the beam, additional sensors can also be deployed to monitor other attributes of a beamline (such as a level of vacuum within respective beamline). Thus, the control system can further be configured so that when a sensor detects a failure in a beamline, as represented by a change in a vacuum level within said beamline, the control system can automatically shut down the corresponding accelerator and close corresponding valves to isolate a region with the vacuum leak from the rest of the plant.

Figure 4D:
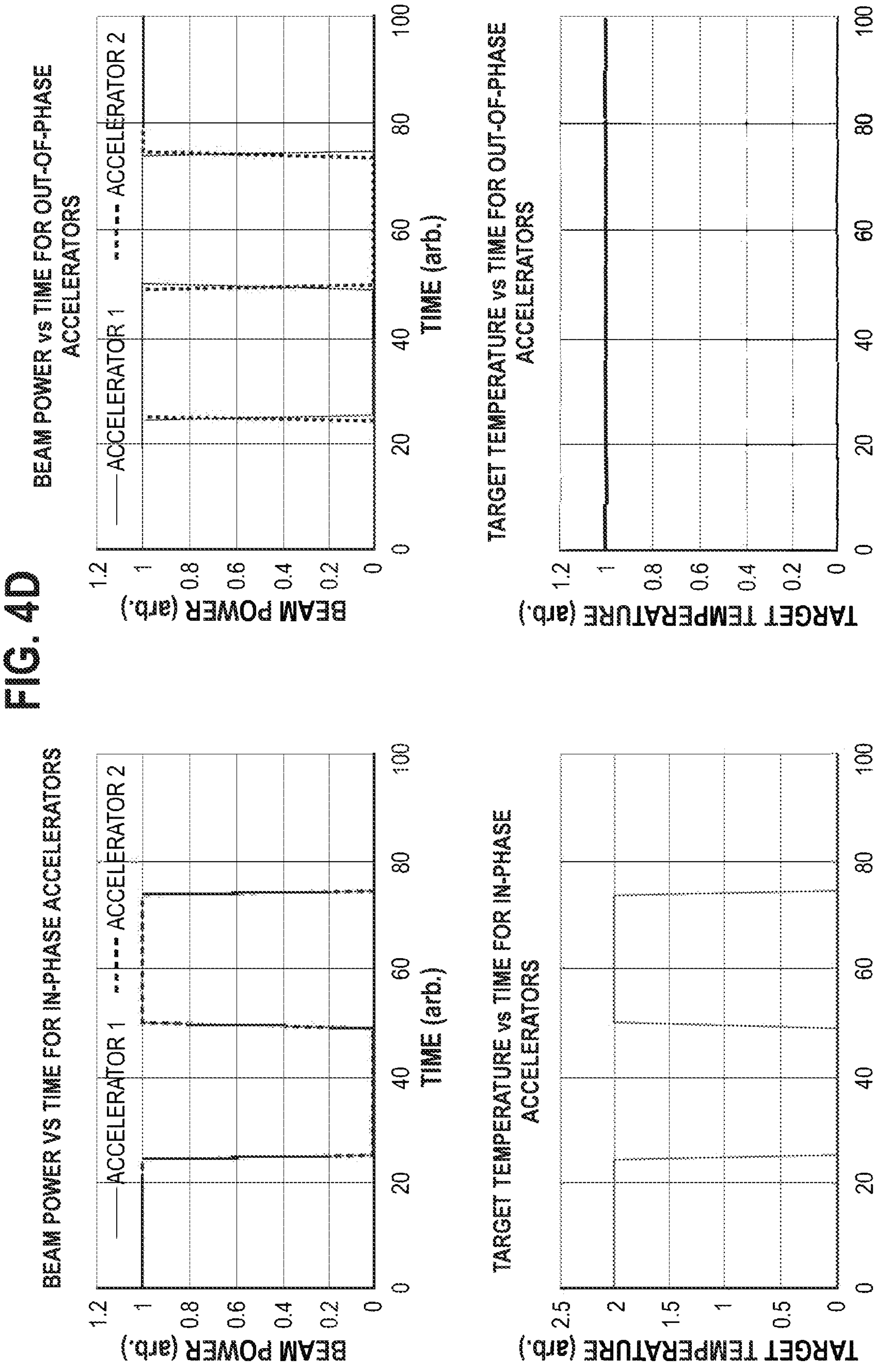
FIG. 4D illustrates a control parameter that can be monitored and controlled by the control system of FIG. 4AFIGS. 4A and 4B.

Further, a combined control system can be provided that integrates individual control systems of each accelerator 110 and 120, each beamline 130 and 140, the target cooling system 160, the hot cell 170, and other components of the system for producing a radioisotope. For example, the combined control system can be used to time a production of beam pulses by the first and second accelerators 110 and 120 such that the beam pulses arrive at the target holder 150 out of phase as shown in FIG. 4D, which can help to limit temperatures seen in the target and can help to ensure stability of the broader electrical grid.

Moreover, the control system can notify an operator through visual indicators such as a warning signal on a display or flashing a light within a control room. Alternatively, or in addition, the control system can be configured to notify the operator through short message service (SMS), email, phone call, instant messaging (IM), or other appropriate means.

The status of the sensors of the control system can be monitored remotely. For example, the control system can be configured to transmit the status of the sensors via a remote network such as internet or intranet to where the operator can access the remote network even if the person or machine is not physically present at the facility where the beamline being monitored is located, thus enabling capabilities to remote troubleshoot and remote monitoring.

Figure 5A:
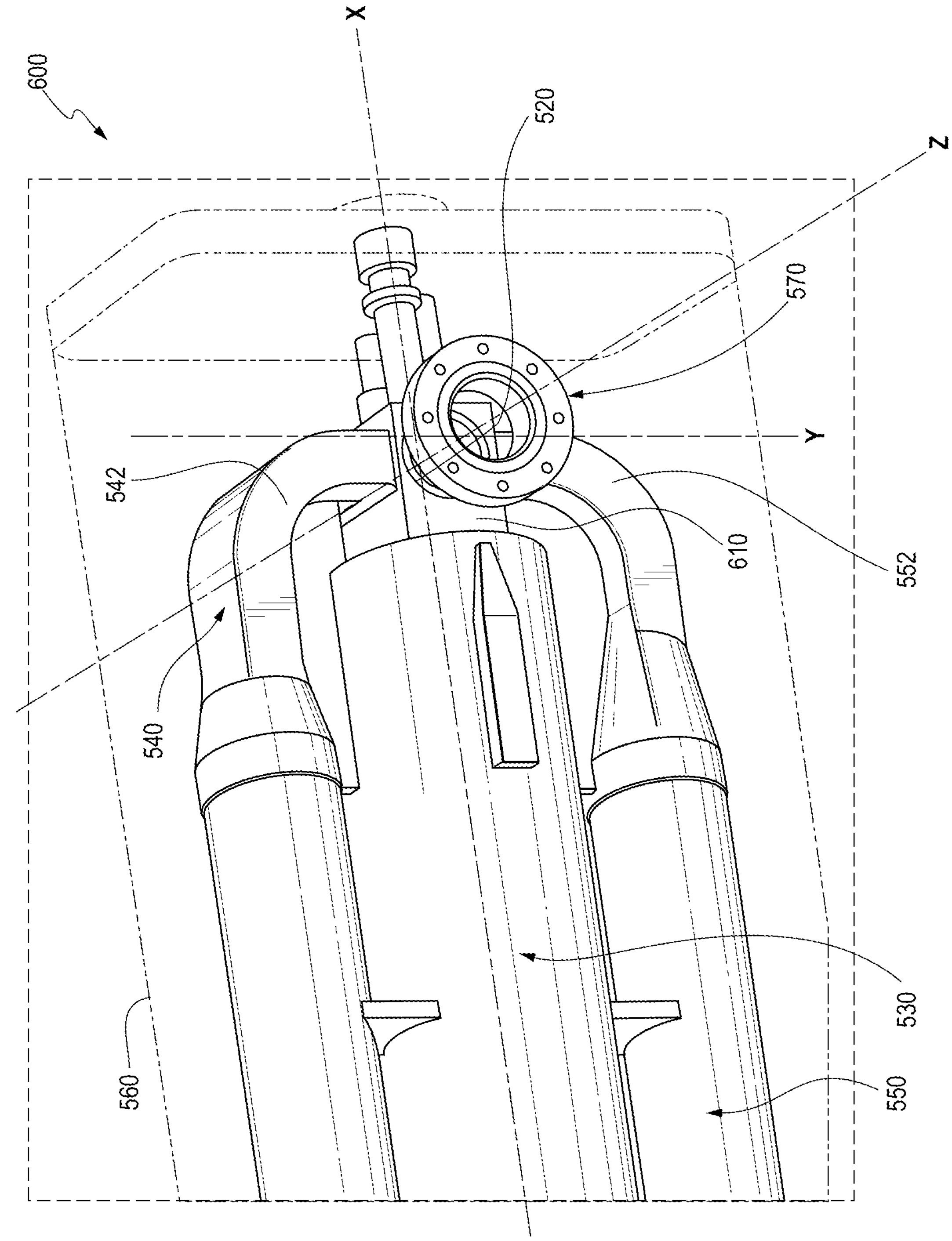
FIGS. 5A and 5B illustrate perspective views of a target assembly according to an exemplary embodiment with a trident region annotated in dashed-lines.

FIG. 5A illustrates a trident region 600 of a target assembly 500 that allows the target holder 150 to be irradiated from opposite directions. The target assembly 500 can be encased within a vacuum pipe 560. That vacuum pipe 560 can include a first beamline connection point 570 on a first side to engage the first beamline 130, and a second beamline connection point 515 (not shown in FIG. 5A) on a second side opposite from the first side to engage the second beamline 140. The target assembly 500 can include a target housing 610 that includes first target window 520, a target manipulation access 530, a first cooling pipe 540, and a second cooling pipe 550. It can be appreciated that although FIG. 5A is viewed from a perspective facing the first target window 520 and the first beamline connection point 570, the target assembly 500 can further include a second target window 525 (not shown in FIG. 5A) opposite from the first target window 520 in a substantially similar manner.

The first target window 520 and the second target window 525 can separate an interior of the target assembly 500, which can be engaged to the target cooling system 160 through the first cooling pipe 540 and the second cooling pipe 550, from an exterior of the target assembly 500, which is encased in the vacuum pipe 560 that in turn engages the first beamline 130 and the second beamline 140 through the first beamline connection point 570 and the second beamline connection point 515 respectively. In an exemplary embodiment, the first target window 520 and/or the second target window 525 can have a concave-shape, in which the curvature is directed inwardly toward target disks, as described in U.S. patent application Ser. No. 15/526,699 (U.S. PG. Pub. No. 2017/0337997), titled "Apparatus for Preparing Medical Radioisotopes", which is hereby incorporated by reference in its entirety.

Using FIG. 5A as an example, the first beamline 130 and the second beamline 140 can transport electron beams toward the target holder 150 (held within the target assembly 500) from opposite directions, represented by the Z-axis. Meanwhile, the target holder 150 can be cooled by a first end 542 of the first cooling pipe 540 and a first end 552 of the second cooling pipe 550 from the Y-axis. Lastly, the target holder 150 can be inserted and removed via the target manipulation access 530 from the X-axis. In an embodiment, the first cooling pipe 540 can serve as a coolant inlet and the second cooling pipe 550 can serve as a coolant outlet or vice-versa.

Figure 5B:
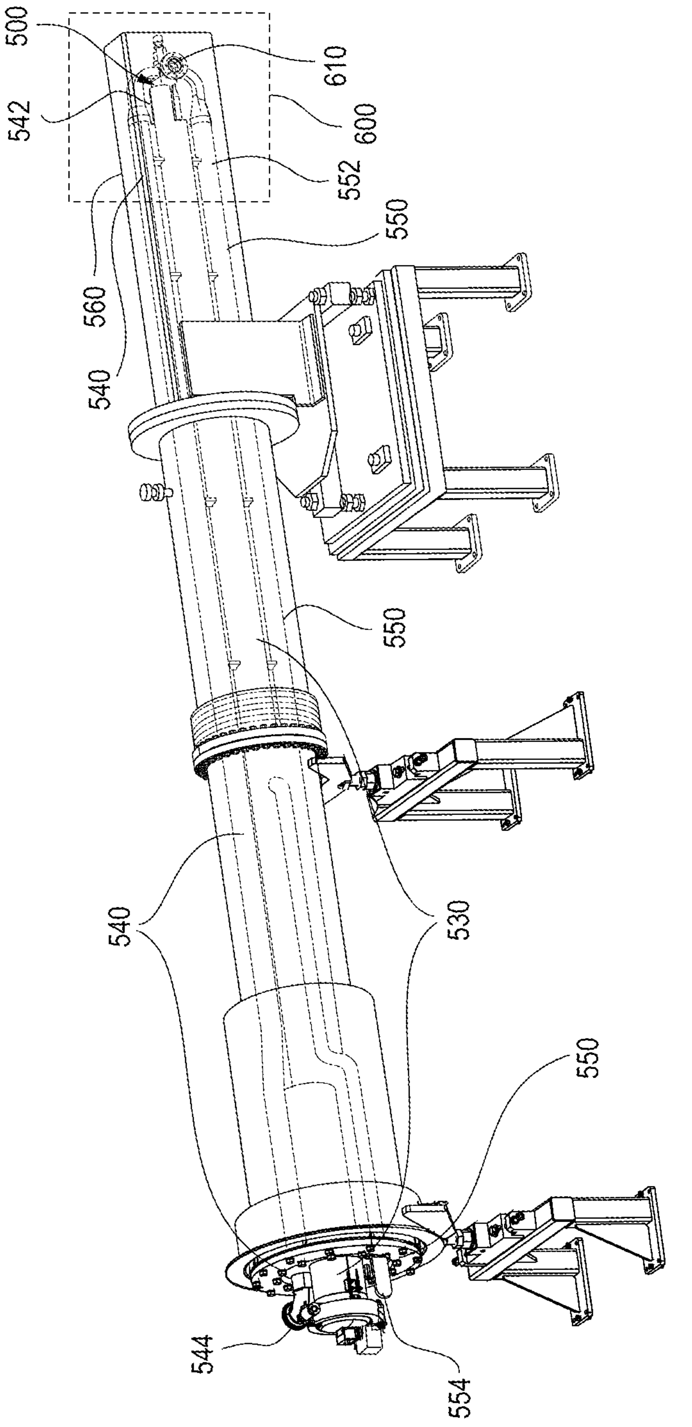
Figure 12:
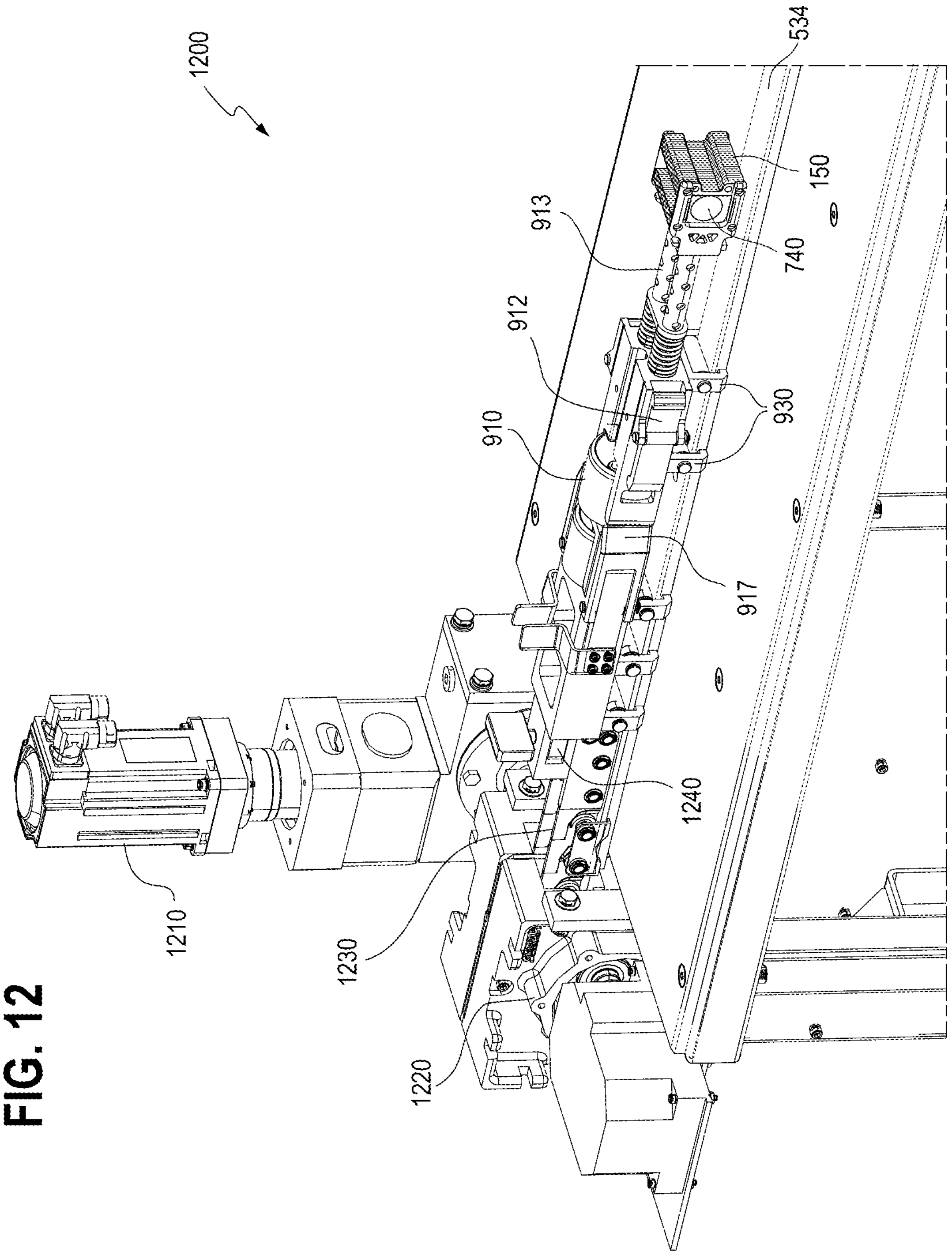
FIG. 12 illustrates a perspective view of an insertion apparatus according to an exemplary embodiment.

FIG. 5B offers another perspective view of the target assembly 500 that is relatively zoomed out as compared to FIG. 5A. The trident region 600 illustrated by FIG. 5A is annotated with dashed line in FIG. 5B. As shown in FIG. 5B, a second end 544 of the first cooling pipe 540, a second end 554 of the second cooling pipe 550, and the target manipulation access 530 can extend out of the vacuum pipe 560 into the hot cell 170 (see FIGS. 14 and 15). Therefrom, the first cooling pipe 540 and the second cooling pipe 550 can further be connected to the target cooling system 160 as shown in FIG. 1, and the target manipulation access 530 can further be connected to an insertion apparatus 1200 as shown in FIG. 12.

Figure 6:
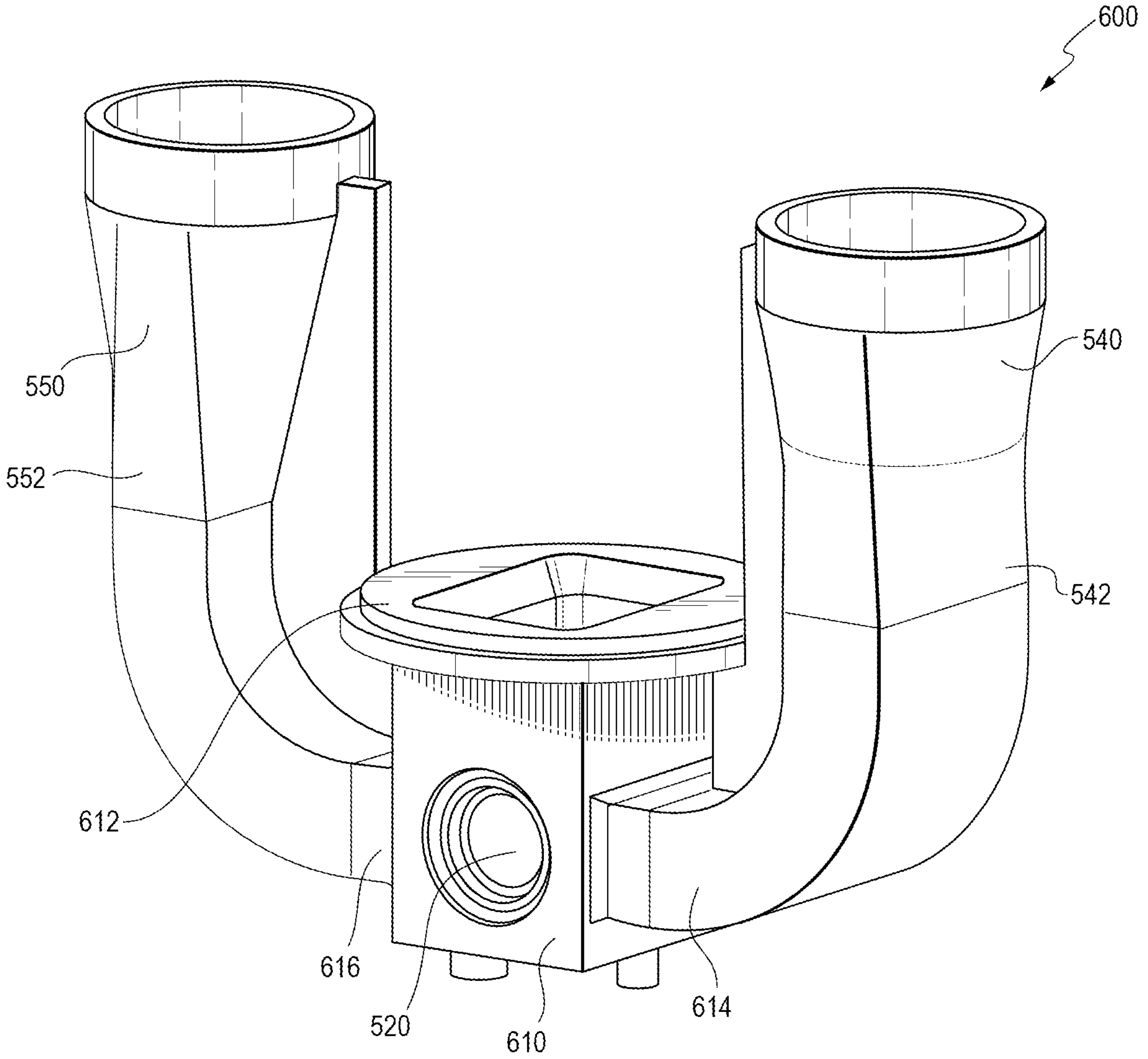
FIG. 6 illustrates a closeup perspective view of the trident region of the target assembly of FIGS. 5A and 5B.

FIG. 6 illustrates another closeup perspective view of the trident region 600 of the target assembly 500. The trident region 600 comprises a target housing 610 with openings therein. In an exemplary embodiment, the target housing 610 can be substantially T-shape. In an alternative embodiment, the target housing can be substantially M-shape. The target housing can include a first opening 612 that is configured to engage the target manipulation access 530 (omitted in FIG. 6). Through the target manipulation access 530 and through the first opening 612, the target holder 150 can be inserted into the target housing 610. The first cooling pipe 540 can engage the target housing 610 at a second opening 614, and the second cooling pipe 550 can engage the target housing 610 at a third opening 616, forming generally a trident-shape. When the target manipulation access 530, the first cooling pipe 540, and the second cooling pipe 550 are engaged to the target housing 610, the trident region can be substantially airtight and prevents coolants from leaking into the vacuum pipe 560. The target housing 610 can further include the first target window 520 and the second target window 525 on a side opposite from the first target window 520, thereby allowing the target housing 610 to accept electron beams from opposite directions from the beamlines.

Figure 7A:
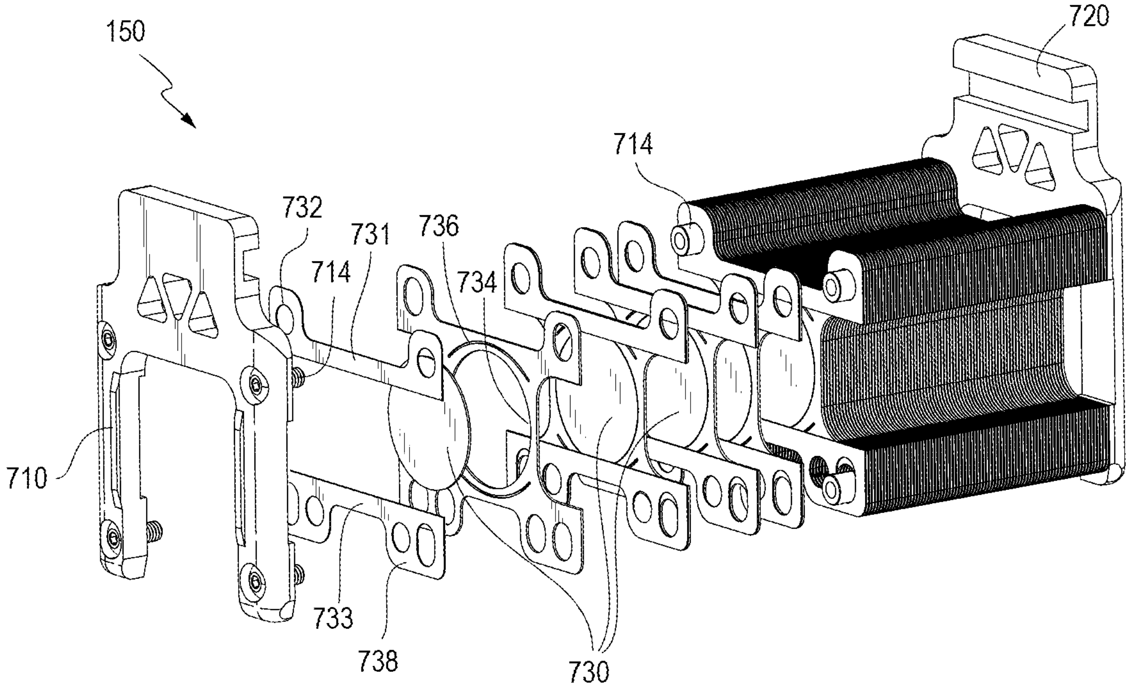
FIG. 7A illustrates an exploded view of a target holder according to an exemplary embodiment.
Figure 7B:
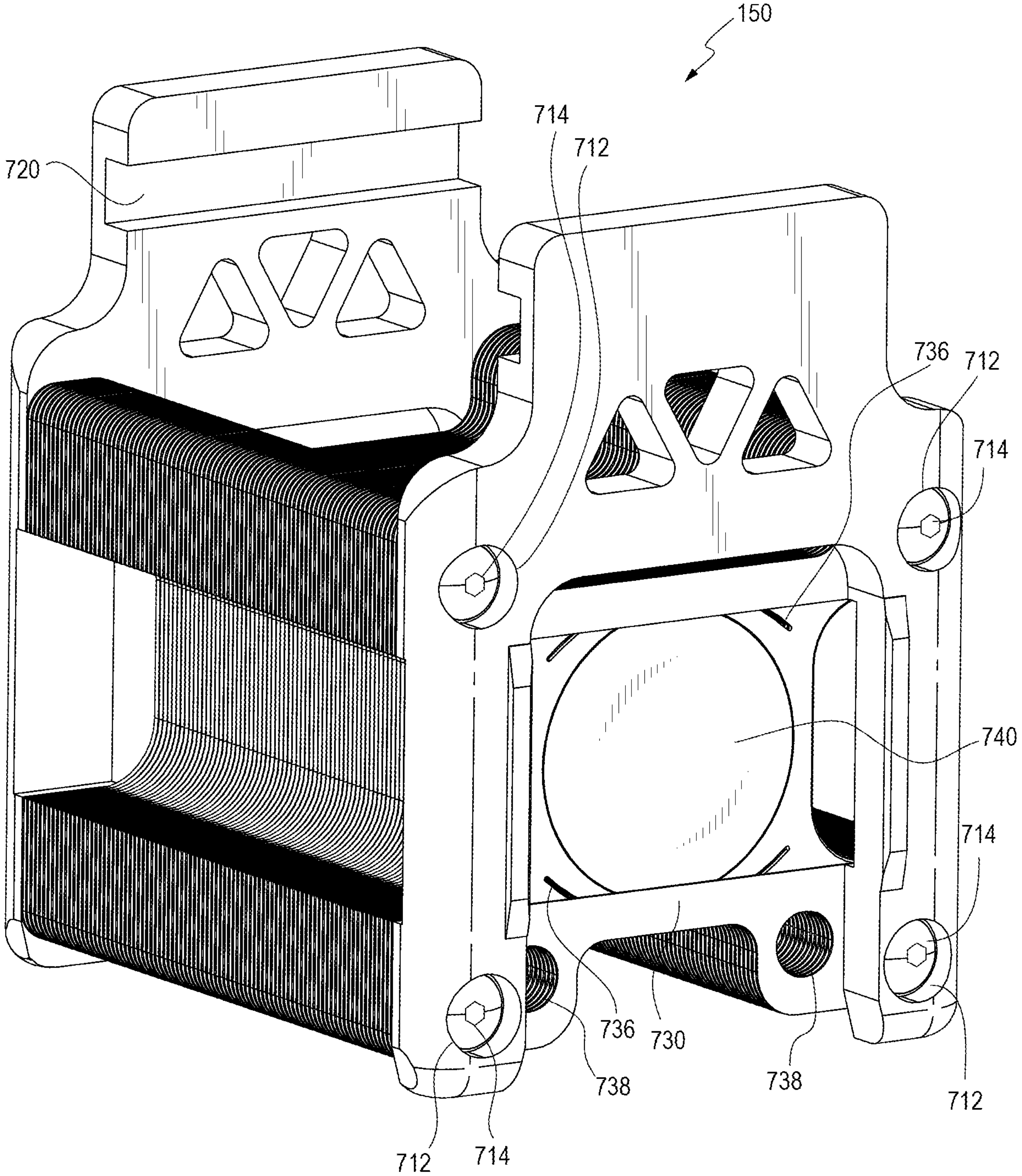
FIG. 7B illustrates a perspective view of the target holder of FIG. 7A.

FIGS. 7A and 7B illustrate the target holder 150 according to an exemplary embodiment. The target holder 150 can include a first tying piece 710 on a first end and a second tying piece 720 on a second end opposite from the first end. In between the first tying piece 710 and the second tying piece 720, a plurality of spacers 730 can be provided to sandwich at least one target disk 740 in a laminated fashion. Put differently, each target disk 740 can be sandwiched in between two spacers 730.

The first tying piece 710 and the second tying piece 720 can each include one or more corresponding openings 712 where a fastener 714 can be inserted. The fastener 714 can be a rod, a bolt, a screw, or other appropriate fastening devices. In an embodiment, the fastener 714 can include multiple portions that can be mated together to form the fastener 714.

Each spacer can include an upper bracket 731 and a lower bracket 733, which can include one or more first openings 732 that correspond to the opening 712 of the first tying piece 710 or the second tying piece 720. Because the first opening 732 of the spacer 730 corresponds to the opening 712 of the tying piece 710 or 720, the fastener 714 can fasten the tying pieces 710 and 720 and the spacers 730 together, with target disk 740 in between the spacers 730, thus forming the target holder 150. In the exemplary embodiment shown in FIGS. 7A and 7B, four openings 712 each can be provided at four corners of the first tying piece 710 and the second tying piece 720, and four fastener 714 can be provided accordingly thereto.

Each spacer 730 can further include a second opening 734 between the upper bracket 731 and the lower bracket 733 that corresponds to a shape of the target disk 740. For example, if the target disk 740 is circular, then the second opening 734 can also be circular. However, a dimension of the second opening 734 can be slightly smaller than the target disk 740 such that the target disk 740 can be held in between two spacers 740 with a substantial portion of the target disk 740 exposed through the respective second opening 734 of the two spacers 740. Moreover, one or more cooling channels 736 can be provided on the spacer 730. In an exemplary embodiment, the cooling channel 736 can take the form of a slit opening. Further, given that the target disks 740 are laminated between spacers 730, the separation between portions of the two spacers 730 that do not overlap with the target disk 740 can functionally serve as additional cooling channels.

In addition, one or more manipulation apertures 738 can also be provided on the spacer 730 (such as on the lower bracket 733), allowing a constructed target holder 150 to be manipulated through an external manipulation mean (such as a mechanical arm or a robotic arm). By way of example, in an embodiment, a mechanical arm or an air driven actuator (such as an actuator 1610 in FIG. 16) can be inserted into the manipulation apertures 738 to loosen the fastener 714 by providing more spaces in between each spacer 730, thus allowing the target disks 740 to drop out of the target holder 150. Of course, the manipulation aperture 738 can also be used for other purposes such as moving the target holder 150.

Figure 8:
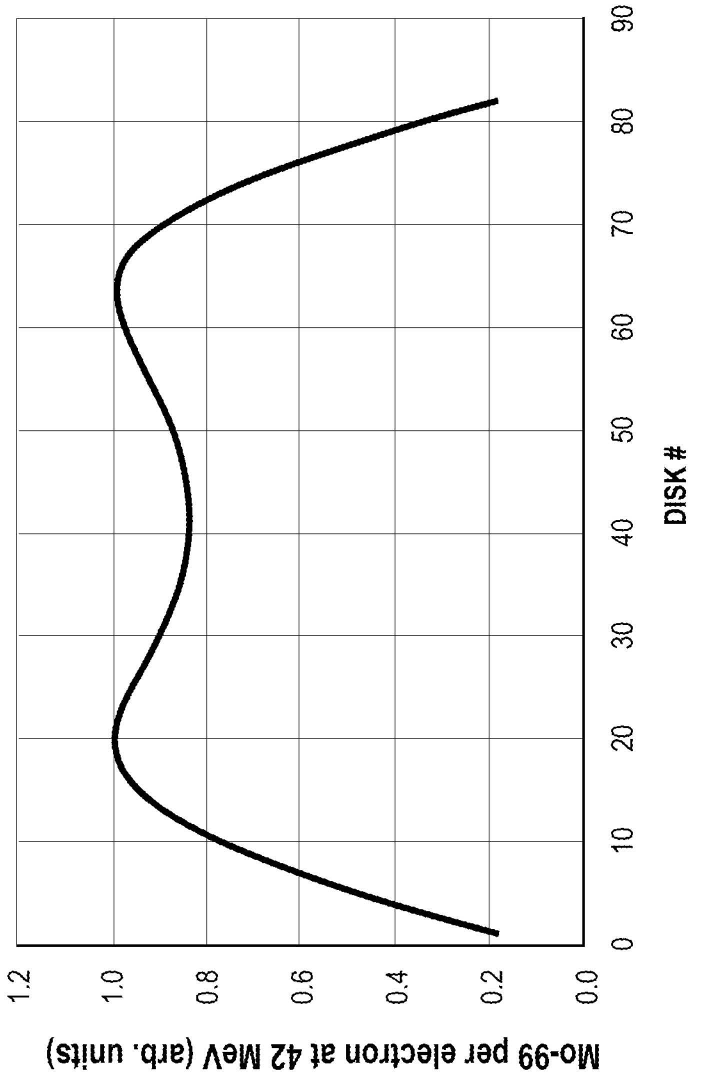
FIG. 8 illustrates a modeled graph showing production of Mo-99 per electron at about 40 MeV versus disk number in a conceptual target.

The target disk 740 can be made of enriched Mo-100 or another isotope. In an exemplary embodiment, the target holder 150 can hold about 80 to about 90 target disks 740 of Mo-100. In the exemplary embodiment, the target disks 740 of Mo-100 can be circular in shape and about 0.3 to about 0.7 mm in thickness, with a diameter of about 25 to about 30 mm, for a total of about 26 0 gram (g) of Mo-100. Illustratively, an exemplary target holder 150 can hold 86 target disks 740 of enriched Mo-100 that are 29 mm in diameter and 0.5 mm thick. However, more or fewer target disks 740 can also be used to produce Mo-99. FIG. 8 illustrates the modeled production of Mo-99 per electron at about 40 MeV versus the number of disks of a conceptual target.

Using the beam intensity and conceptual target parameters shown in FIG. 8, if four hours are needed to remove an activated target and insert a new one, this production rate carried over a seven-day (164 hours) irradiation results in about 2100 curie (Ci) of Mo-99. The same process carried over seven consecutive one-day (20 hours) irradiations results in a weekly total of about 3300 Ci, whereas two (2) consecutive three and-a-half day (80 hours) irradiations results in a weekly total of about 2800 Ci.

Mo-100 constitutes about 9.8 percent of naturally abundant molybdenum. Preferred Mo-100 targets contain about 90 to about 99 percent Mo-100. Typically used targets contain about 95 percent Mo-100.

Figure 9:
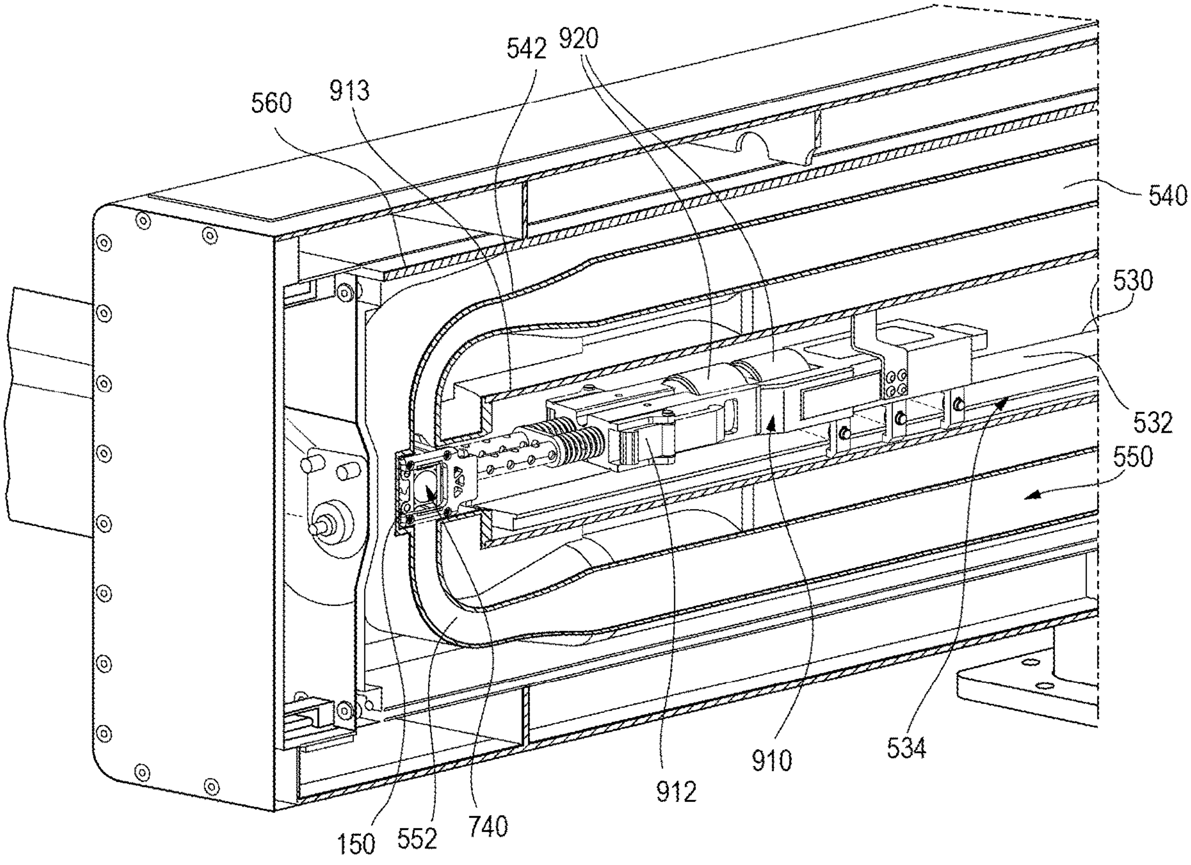
FIG. 9 illustrates a cross-sectional view of the trident region of the target assembly of FIGS. 5A and 5B.
Figure 10:
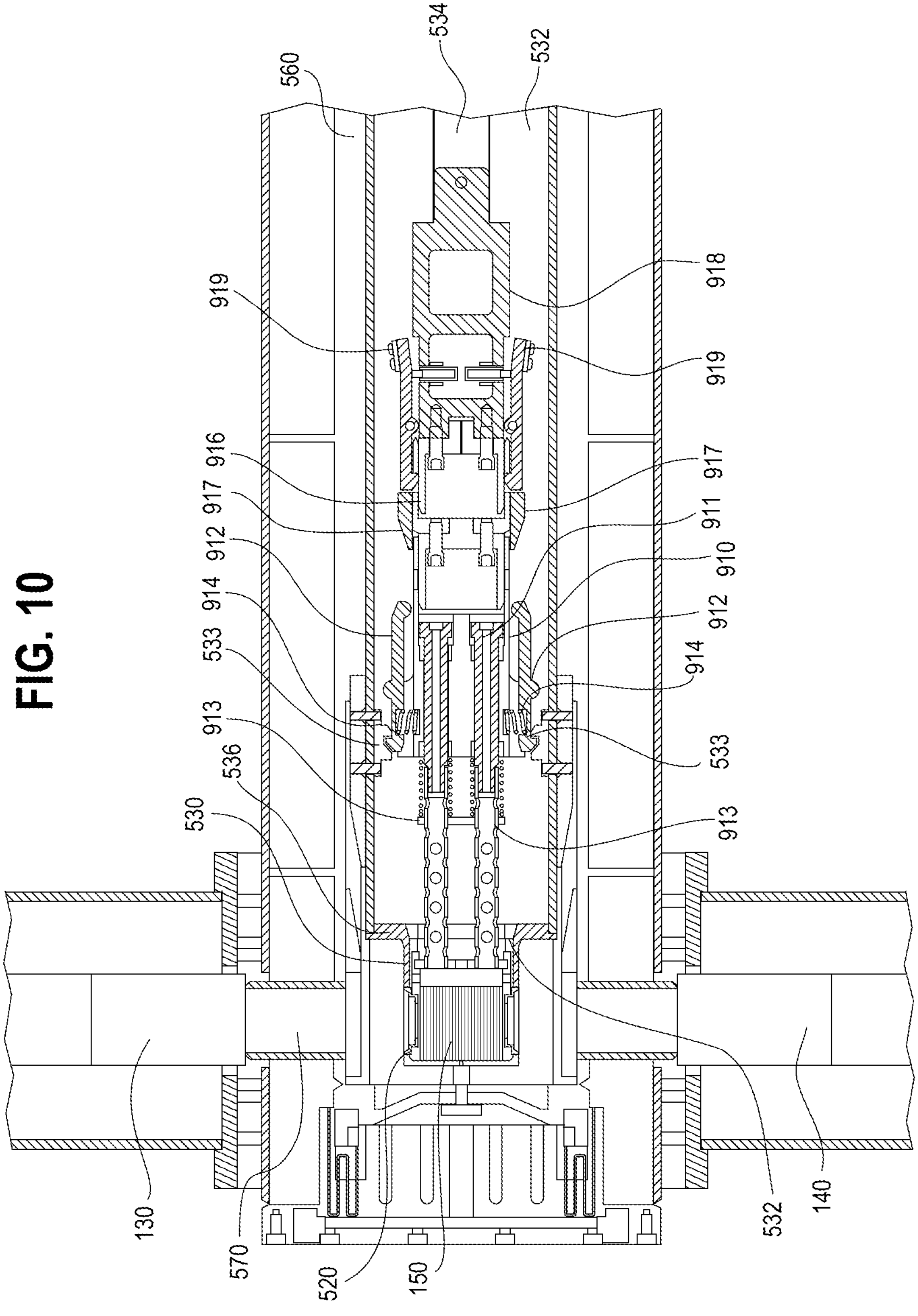
FIG. 10 illustrates another cross-sectional view of the trident region of the target assembly of FIGS. 5A and 5B.

FIGS. 9 and 10 illustration additional cross-sectional views of the trident region 600. First referring first to FIG. 9 in which the trident region 600 is viewed from a side (along the Y-axis of FIG. 5A) after the target holder 150 has been inserted, target disks 740, that are held in place via the target holder 150, can be aligned with beamlines coming in from both directions. In addition, the first cooling pipe 540 on top and the second cooling pipe 550 below the target holder 150 provide coolant from the target cooling system 160 to cool to the target holder 150. In an embodiment, the first cooling pipe 540 can serve as a coolant inlet and the second cooling pipe 550 can serve as a coolant outlet or vice-versa. In the middle is the target manipulation access 530 that can include a target insertion channel 532 where an insertion carriage 910 can be used to insert the target holder 150. Moreover, an insertion rail 534 can be provided in the insertion channel 532, allowing the insertion carriage 910 to move within the insertion channel 532. As shown in FIG. 9, the trident region 600 can be enclosed within the vacuum pipe 560.

FIG. 10 illustrates another cross-sectional view when viewed from above the trident region 600 (along the Z-axis of FIG. 5A). As shown more clearly in FIG. 10, after insertion, the target holder 150 is positioned between the first beamline 130 and the second beamline 140 which extend from opposite directions, allowing target disks 740 therein to be radiated from both directions. As shown in FIG. 10, the first beamline 130 can engage the vacuum pipe 560 at the first beamline connection point 570. The first beamline 130 can be arranged so that an electron beam passes through the first target window 520 to radiate the target disks 740 held within the target holder 150 from a first side. Similarly, the second beamline 140 can engage the vacuum pipe 560 at the second beamline connection point 515 opposite from the first beamline connection point 570 and arranged so that an electron beam passes through the second target window 525 to radiate the target disks 740 held within the target holder 150 from a second side opposite from the first side, thereby radiating the target disks 740 from both sides. Within the target manipulation access 530, one or more cooling channels 536 can be provided to allow some coolant from the target cooling system 160 to flow into the insertion channel 532 to cool the insertion carriage 910. The cooling channels 536 can be purposely designed to control a flowrate of the coolant from entering the insertion channel 532 and to ensure enough coolant flows through the target holder 150. In an exemplary embodiment, the cooling channel 536 can be conical in shape.

The insertion carriage 910 can include one or more clips 912 that can be used to hold the target holder 150 within the target insertion channel 532. According to an exemplary embodiment as shown in FIG. 10, a holding mechanism 533 can be provided within the target insertion channel 532. The holding mechanism 533 can include an indentation that can be mated with a protrusion of the clip 912. Thus, when the insertion carriage 910 is inserted into the target assembly 500, the protrusion of the clip 912 engages the indentation of the holding mechanism 533, holding the target holder 150 in place. Moreover, the insertion carriage 910 can include several detachable sections. For example, the clip 912 can be located at a first section 911 of the insertion carriage 910. Once the clip 912 is engaged with the holding mechanism 533, the remaining sections of the insertion carriage 910 can be retracted before radiation begins. Further, a spring mechanism 914 can be coupled to a first end of the clip 912 to lock the clip 912 in place with the holding mechanism 533. One or more section spacers 920 can be used to space the sections of the insertion carriage 910 apart. The first section 911 of the insertion carriage 910 can also include one or more engaging mechanism 913 that is positioned to engage the target holder 150.

Further, a ramp 917 can be provided at a second section 916 of the insertion carriage 910. The second section 916 can be attachable and detachable from the first section 911. The ramp 917 can engage a second end of the clip 912 opposite from the first end, thereby creating a levering force to disengage the clip 912 from the holding mechanism 533. The insertion carriage 910 can also include a third section 918 that is detachable and attachable from the second section 916. The third section 918 can include an attachment mechanism 919 that attaches the third section 918 to the second section 916. The attachment mechanism 919 can include, for example, a spring or a hydraulic to hold the third section 918 in place with the second section 916.

Figure 11:
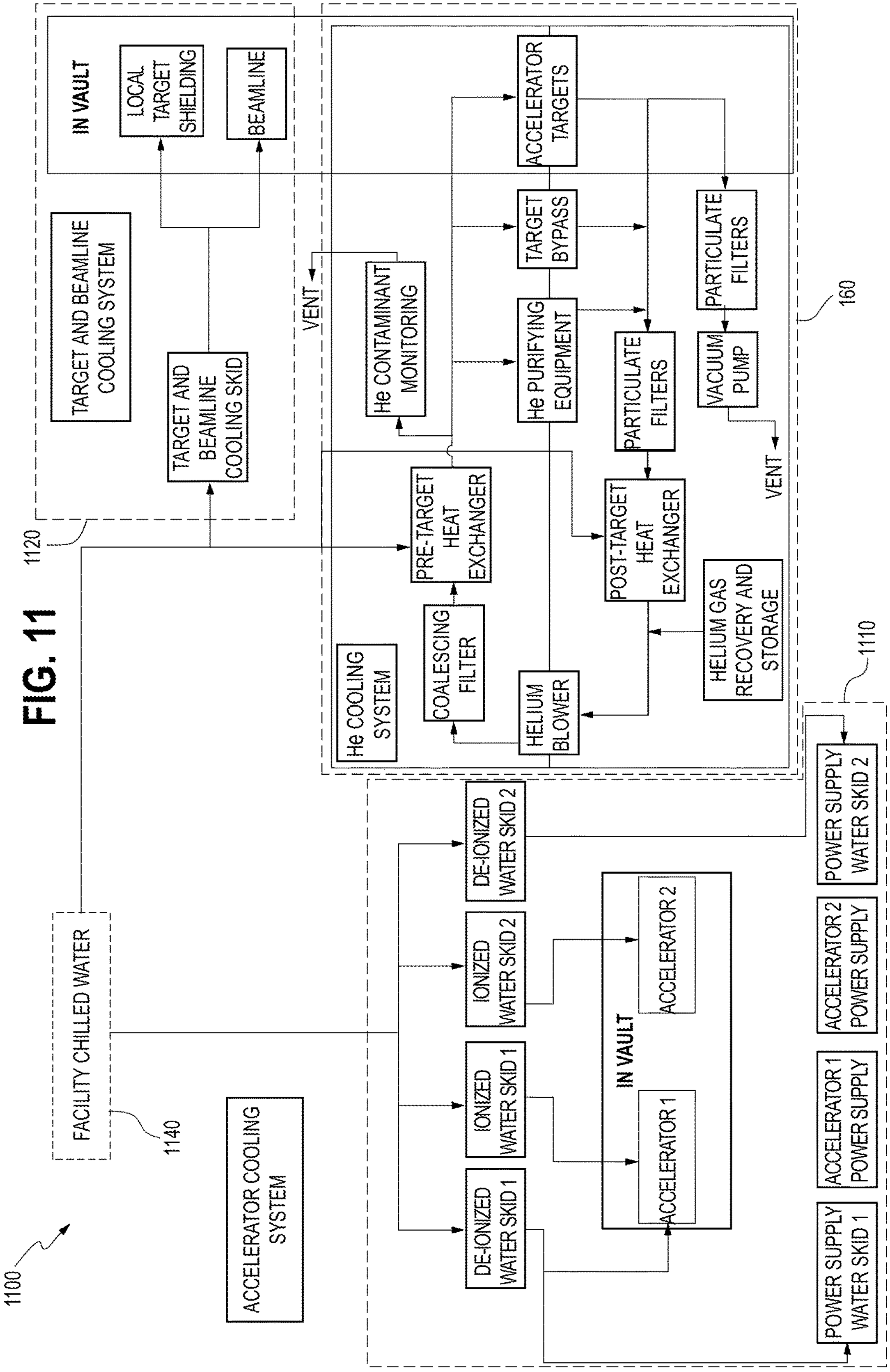
FIG. 11 illustrates a system diagram of an overall cooling system according to an exemplary embodiment.

FIG. 11 illustrates a system diagram of an overall cooling system 1100 according to an exemplary embodiment. The overall cooling system can include the target cooling system 160. Cooling the target holder 150 can be a complex problem due to a high amount of power deposited into the target holder 150 by the electron beams and a high amount of radiation produced during the process. In an exemplary embodiment, gaseous helium can be used to cool the target holder 150. Helium is nonreactive with Mo, even at elevated temperatures. In addition, helium has a very low cross section for interaction with the prompt radiation created by the accelerators, and thusly does not create activated components in large amounts. However, other coolants such as nitrogen or hydrogen can also be used. In an alternative embodiment, liquid coolant can be used to cool the target holder 150.

The target cooling system 160 can transfer heat from the target holder 150 to a chiller system via direct heat exchange as shown in FIG. 11. In an exemplary embodiment, a helium blower can be used, which moves high pressure (of about 300 psia) helium though the system at a high mass flow (above 350 g/s) to ensure proper cooling of the target holder 150.

In addition to the blower and heat exchanger, the target cooling system 160 can include additional sections containing a heat exchanger, to remove heat added by the blower, a filtering system, a monitoring system, and a purification system, to ensure contaminant free operation.

Within the target cooling system 160, the helium gas or other coolant can move from the blower and other subsystems through pipes within both the interior walls of the accelerator vault 180 and the local target shielding 190 to the target holder 150 held in the target assembly 500. Put differently, the target cooling system 160 can ultimately be connected with the first cooling pipe 540 and the second cooling pipe 550 through various pipes and mechanisms in order to cool the target holder 150.

The overall cooling system 1100 can further include an accelerator cooling system 1110 and a target shielding and beamline cooling system 1120. In an exemplary embodiment, for the accelerator cooling system 1110 and the target shielding and beamline cooling system 1120, liquid cooling can be utilized in combination with various skids. As explained above, the skids can be held in the one or more water skid rooms 188 of FIG. 1. Facility chilled water 1140 can be used to operate the different cooling systems as shown in FIG. 11.

Figure 13:
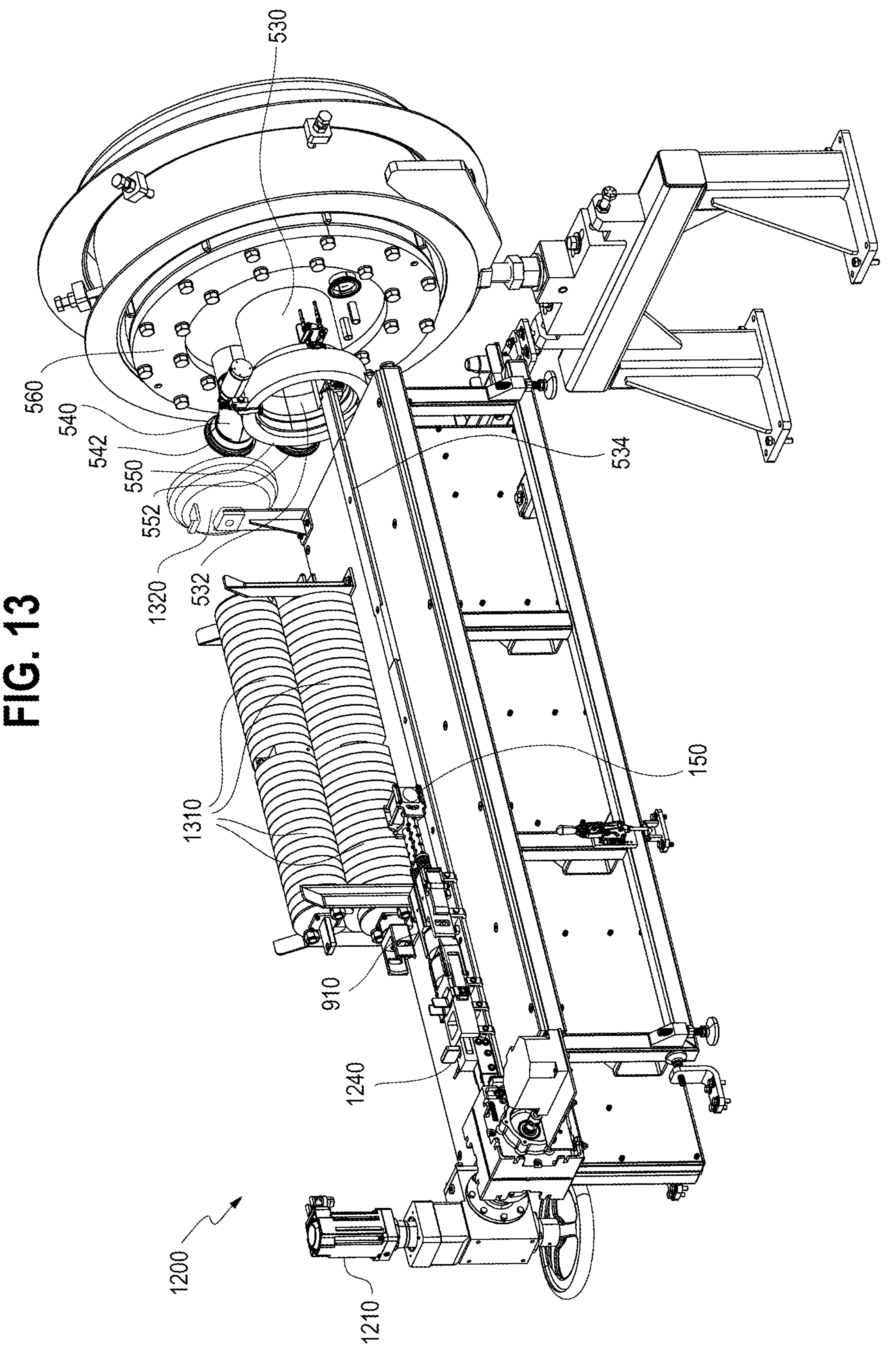
FIG. 13 illustrates another perspective view of the insertion apparatus of FIG. 12.

FIGS. 12 and 13 illustrate several perspective views of an insertion/removal apparatus 1200 according to an exemplary embodiment. The insertion apparatus 1200 can be used to push or pull the insertion carriage 910 along the insertion rail 534, thereby inserting or retrieving the target holder 150 into or from the target housing 610. The insertion apparatus 1200 can include a motor 1210 (such as an electric step motor) coupled with a push-pull chain 1220 to push or pull the insertion carriage 910. The insertion apparatus 1200 can further include a linear position transducer 1230 and a pusher trolley 1240. During insertion or retrieval, the insertion carriage 910 can be coupled with the pusher trolley 1240, thus pushing or pulling the insertion carriage 910. As shown in FIG. 12, the insertion carriage 910 can further include one or more rail couplers 930 that secure the insertion carriage 910 on the insertion rail 534.

Referring to FIG. 13, during operation, the motor 1210 can push the insertion carriage 910 that has the target holder 150 engaged thereon into the trident region 600 of the target assembly 500 through the target manipulation access 530 prior to the radiation. Once the clips 912 of the first section 911 of the insertion carriage 910 engages the holding mechanism 533 of the insertion channel 532 as shown in FIG. 10, the target holder 150 is thereby secured and ready for irradiation. The remaining sections of the insertion carriage 910 can then be disengaged from the first section 911 and be pulled out by the motor 1210.

Thereafter, radiation plugs 1310 can be inserted into the insertion channel 532 through the insertion carriage 910. The radiation plugs can be coupled into segments. In some embodiments, multiple radiation plugs 1310 can be paired together as one segment and multiple segments can be connected together.

Once the radiation plugs 1310 are inserted into the insertion channel 532, the insertion carriage 910 can once again be retracted by the motor 1210. Thereafter, a portion of the insertion rail 534 can be disengaged, allowing enough clearance for a channel door 1320 to seal the insertion channel 530. In an exemplary embodiment, the channel door 1320 can withstand and seal a pressurized insertion channel 530 filled with e.g., up to 300 psi of helium.

After transmutation and after the channel door 1320 is opened, the disengaged portion of the insertion rail 534 can be reengaged. The motor 1210 can once again engage the insertion carriage 910 to pull the radiation plugs 1310 out. Thereafter, the insertion carriage 910 can retrieve the target holder 150 holding transmuted Mo-99 out of the trident region 600.

After irradiation, the originally present Mo-100 that comprised the target disks 740 held by the target holder 150 has partially been transmuted into Mo-99 and is radioactive. The irradiated target disks 740 can be retrieved from the trident region 600 and placed into the hot cell 170 via the insertion apparatus 1200.

Figure 14:
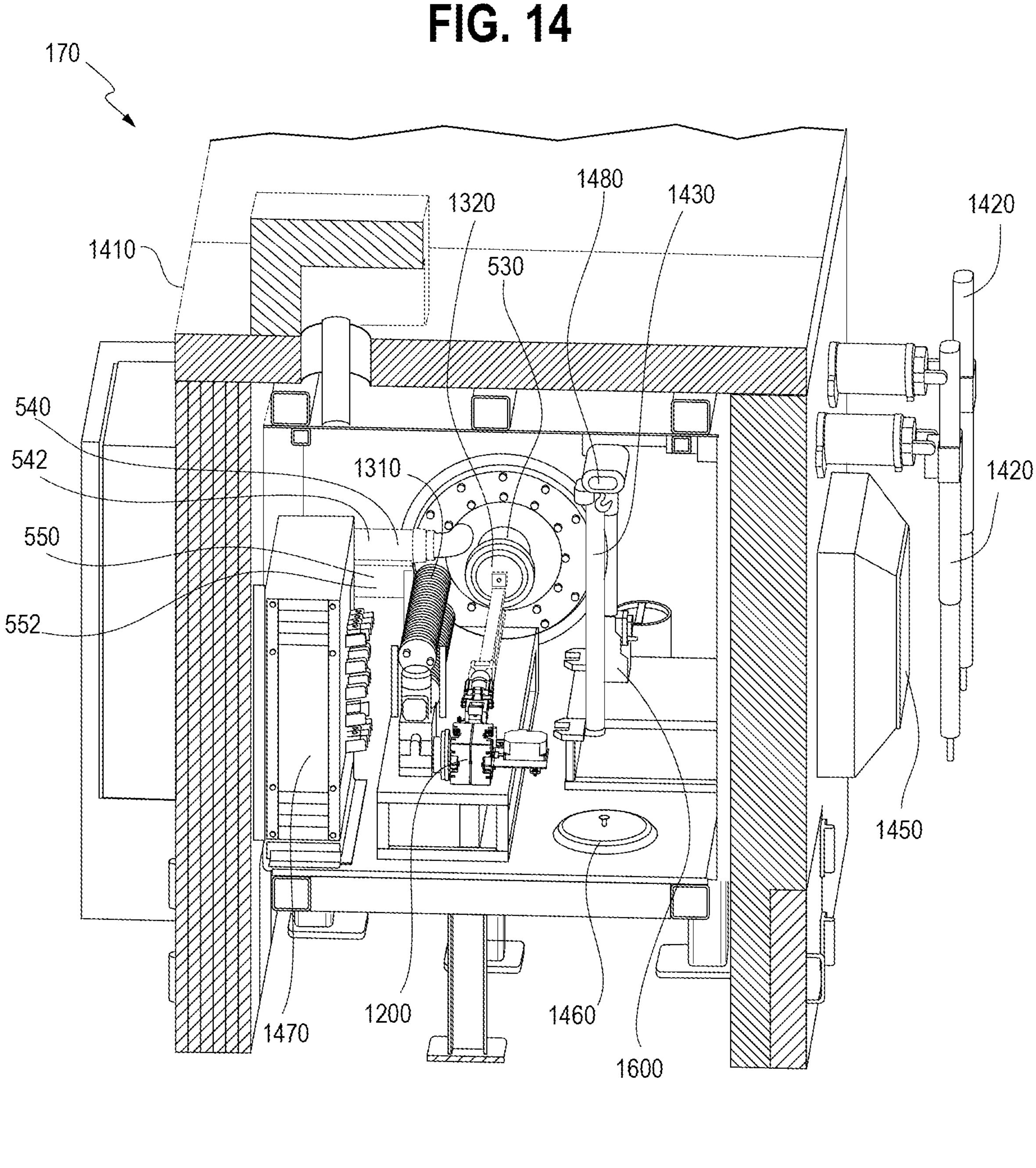
FIG. 14 illustrates a perspective view of a hot cell according to an exemplary embodiment.
Figure 15:
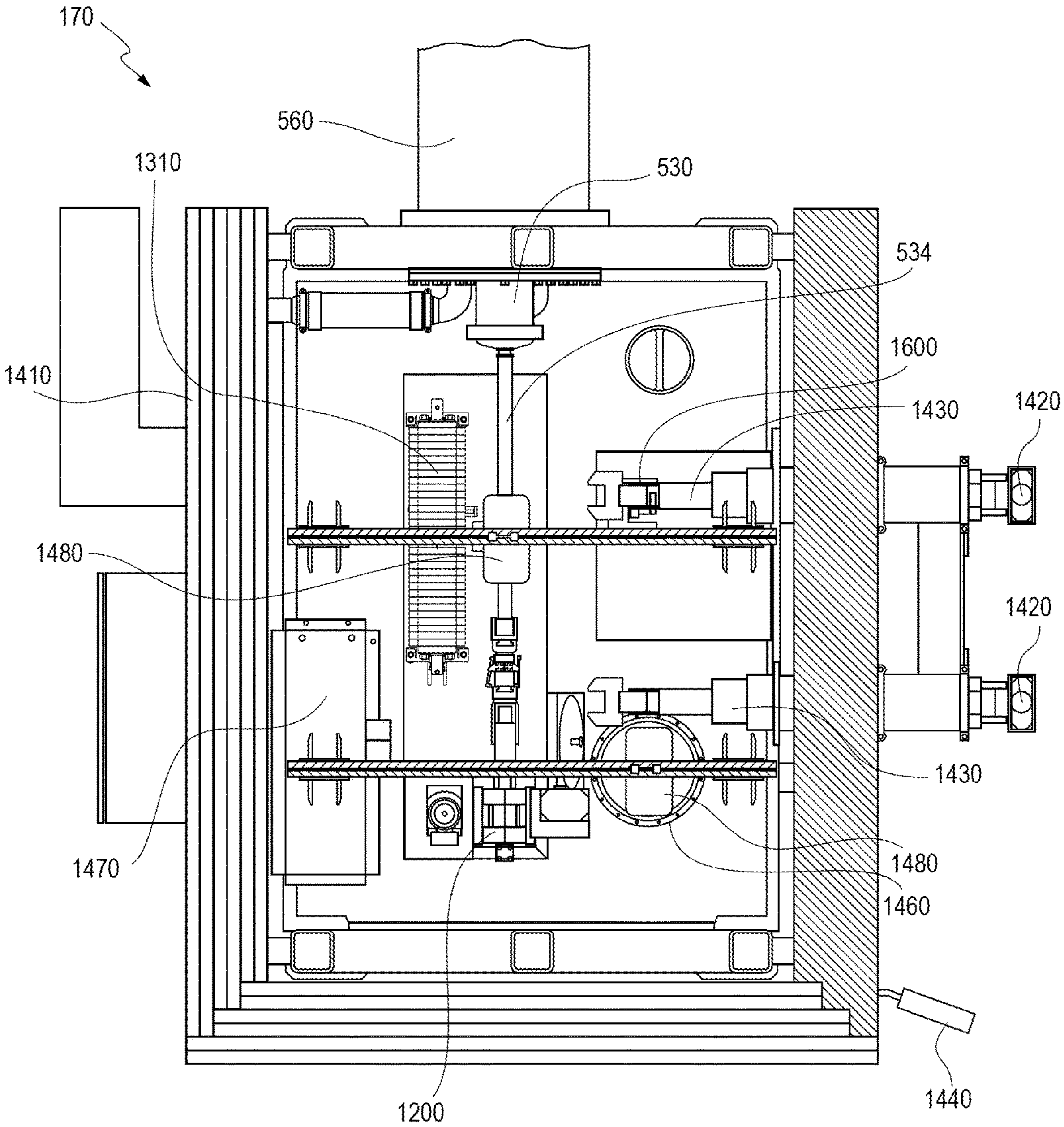
FIG. 15 illustrates another perspective view of the hot cell of FIG. 14.

FIG. 14 illustrates a perspective view of the hot cell 170 according to an exemplary embodiment. FIG. 15 further illustrates a cross-sectional view of the hot cell of FIG. 14. As shown in FIGS. 14 and 15, the insertion apparatus 1200 can be encased within the hot cell 170. In an exemplary embodiment, the hot cell 170 can include hot cell shielding 1410 that serves as a radiation shield to ensure radiation does not leak out of the hot cell 170. The hot cell 170 can also be fitted with a manipulator 1420 coupled to a mechanical arm 1430. An operator can use the manipulator 1420 to control the mechanical arm 1430 to perform operations such as engaging the target holder 150 to the insertion carriage 910, placing the radiation plugs 1310 onto the insertion rail 534, and other operations as needed. The mechanical arm 1430 can further be engaged with a target unloader 1600 that is designed to engage with the manipulation apertures 738, as shown in FIG. 7B and described above, to loosen the target holder 150, allowing the target disks 740 to drop out therefrom. A monitoring system 1440 can be provided to allow the operator to monitor various conditions within the hot cell 170. A viewing window 1450 can also be provided on the hot cell 170 to allow the operator a visual into the hot cell 170. Alternatively, the mechanical arm 1430 can be controlled electronically and remotely by a remote operator. One or more trap doors 1460 can also be provided in the hot cell 170 to permit loading and unloading of the target holder 150. Further, the hot cell 170 can include a storage compartment 1470 that can be used to store used target holders 150. Moreover, a crane system 1480 can be used for more precise movements of different components within the hot cell 170.

Figure 16:
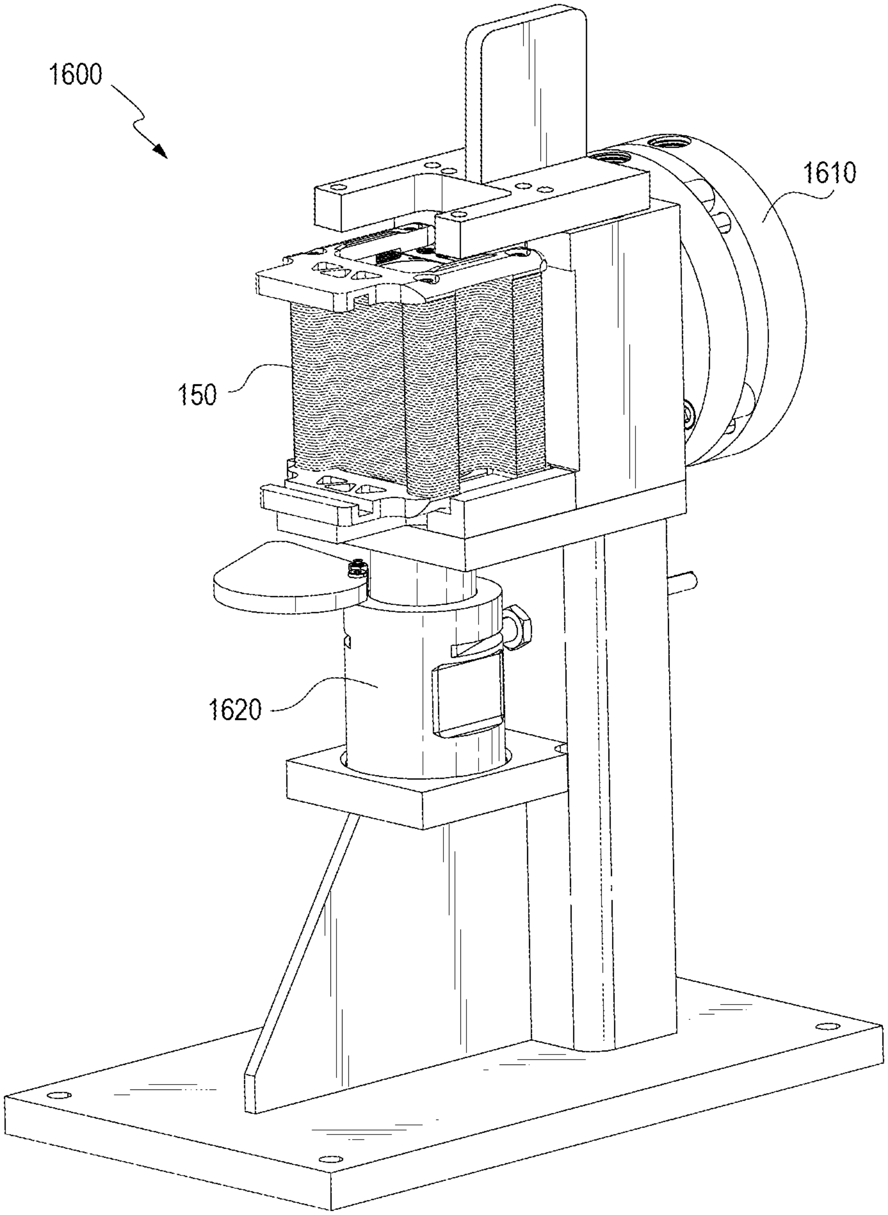
FIG. 16 illustrates a perspective view of a target unloader according to an exemplary embodiment.

FIG. 16 illustrates a perspective view of the target unloader 1600 according to an exemplary embodiment. The target unloader 1600 can include an actuator 1610 configured to pull apart or loosen the lamination of the target holder 150. The actuator 1610 can be air driven in an exemplary embodiment. A canister 1620 can be provided to hold transmuted Mo-99-containing target disks 740. In an exemplary embodiment, the canister 1620 can eventually be removed from the hot cell 170 so the transmuted product isotope (such as Mo-99) can be retrieved therefrom.

The irradiation process creates a high amount of radiation that does not go into the process. This radiation must be contained, which is the role of a shielding. As explained above, the accelerator vault 180 can be provided to shield the surroundings from radiation emitted from the system 100. Further, localized shielding, such as the local target shielding 190, can be placed around the trident region 600 to reduce the total amount of concrete needed for the vault.

Figure 17A:
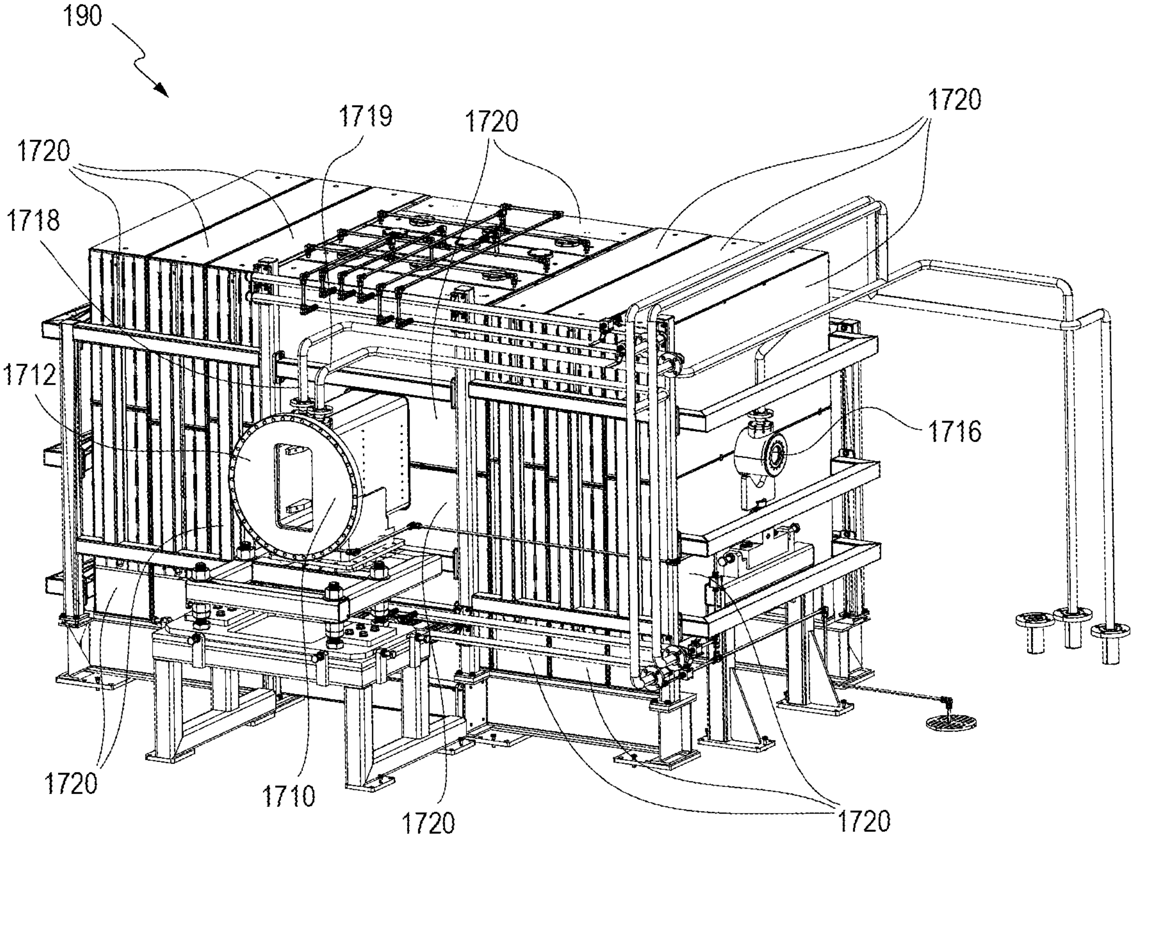
FIG. 17A illustrates a perspective view of a local target shielding according to an exemplary embodiment.
Figure 17B:
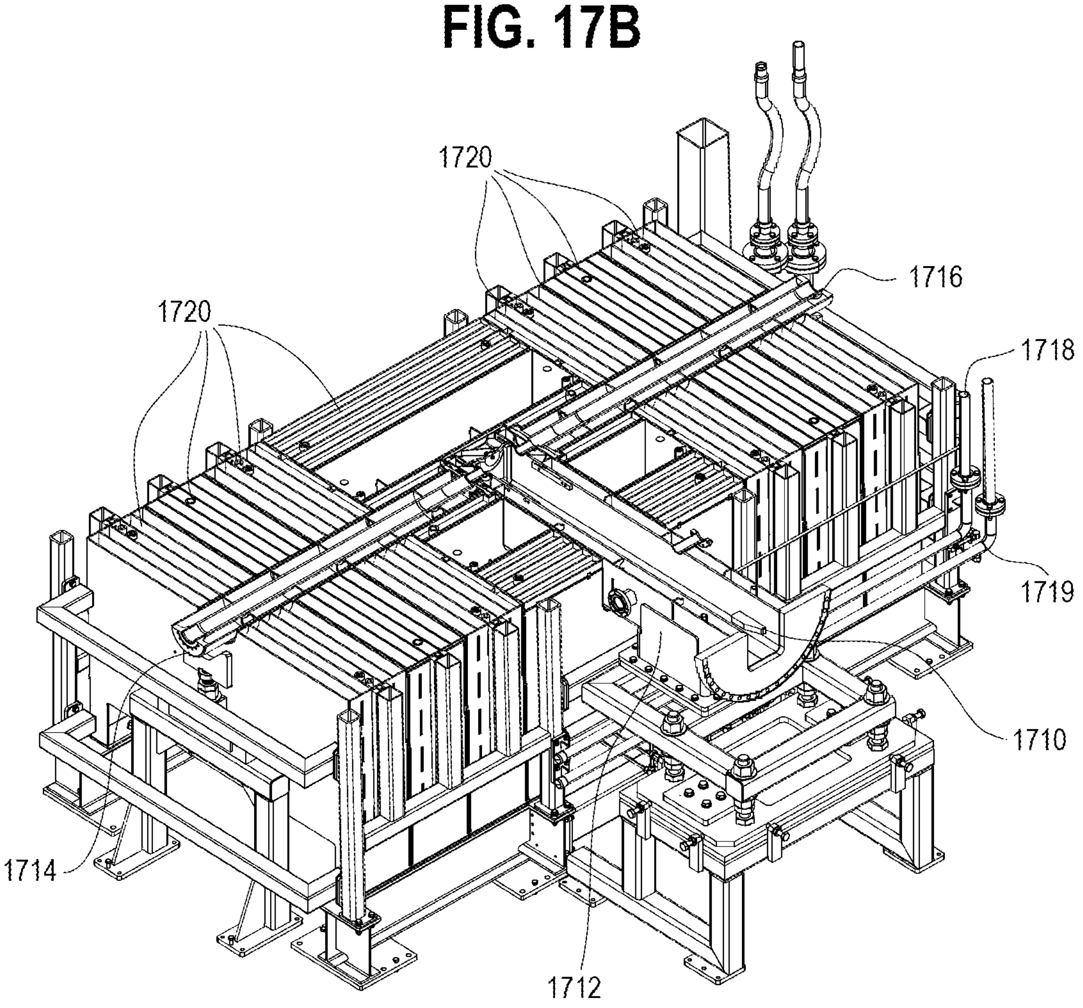
FIG. 17B illustrates a cross-sectional view of the local target shielding of FIG. 17A with a different location for coolant inlet and outlet.
Figure 17C:
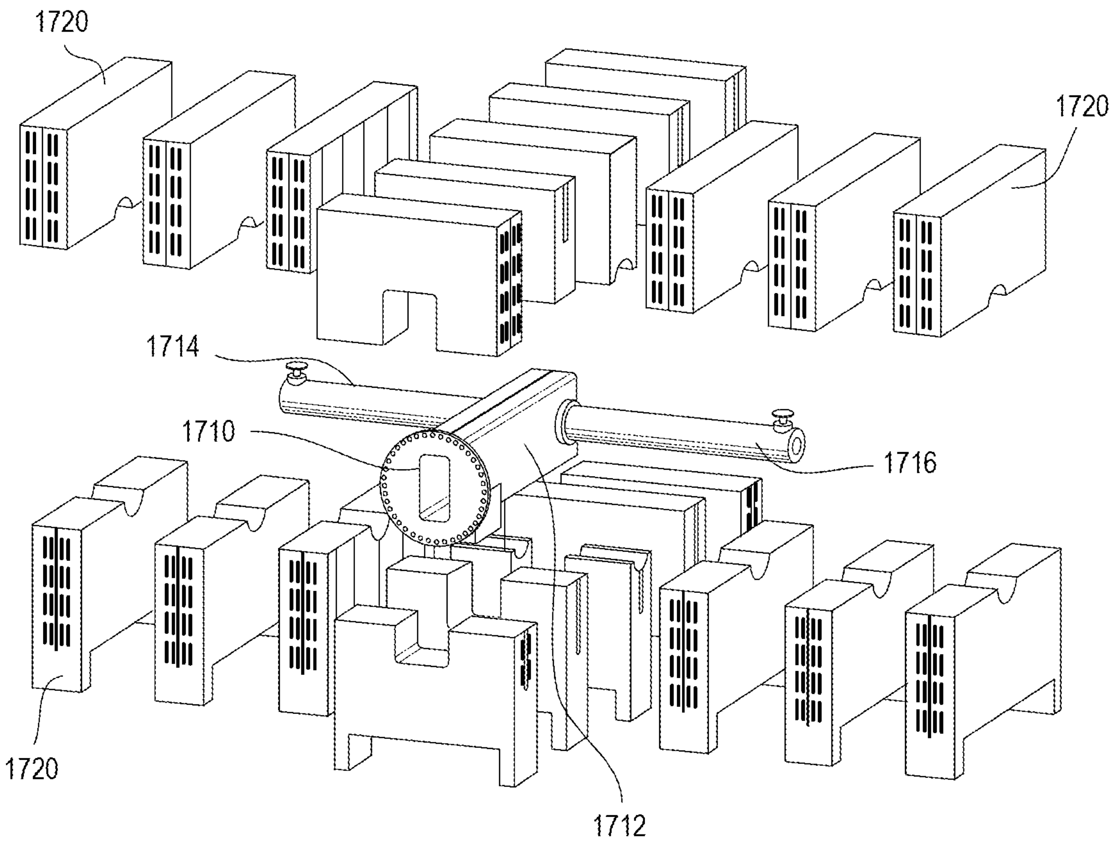
FIG. 17C illustrates an exploded view of the local target shielding of FIG. 17A.

FIGS. 17A, 17B, and 17C illustrate the local target shielding 190 according to an exemplary embodiment. The local target shielding 190 can include a jacket 1710. The jacket 1710 can encase the vacuum pipe 560 in addition to a portion of the first beamline 130 and a portion of the second beamline 140. Referring to FIG. 17C specifically, a first section 1712 of the jacket 1710 can be designed to encase a portion of the vacuum pipe 560, a second section 1714 of the jacket 1710 can be designed to encase a portion of the first beamline 130, and a third section 1716 of the jacket 1710 can be designed to encase a portion of the second beamline 140.

In an exemplary embodiment, the jacket 1710 can be liquid-cooled. Specifically, the jacket 1710 can be filled with a mix of water steel shot and cooled by water flow, though it is to be understood that other liquids such as ethylene glycol-water mixtures can also be used with the jacket 1710. The jacket 1710 can be a component of the target shielding and beamline cooling system 1120 (see FIG. 11). An inlet 1718 and an outlet 1719 can be provided on the jacket 1710 to facilitate coolant flow through the jacket 1710; FIG. 17A and FIG. 17B illustrate two exemplary locations of where the inlet 1718 and the inlet 1719 can be provided on the jacket 1710.

The local target shielding 190 can further include a plurality of shielding block containers 1720 surrounding the jacket 1710. The shielding block containers 1720 can be modular, such that one or more shielding block containers 1720 can be installed or removed from the local target shielding 190 to provide ease for installation maintenance.

Figure 18:
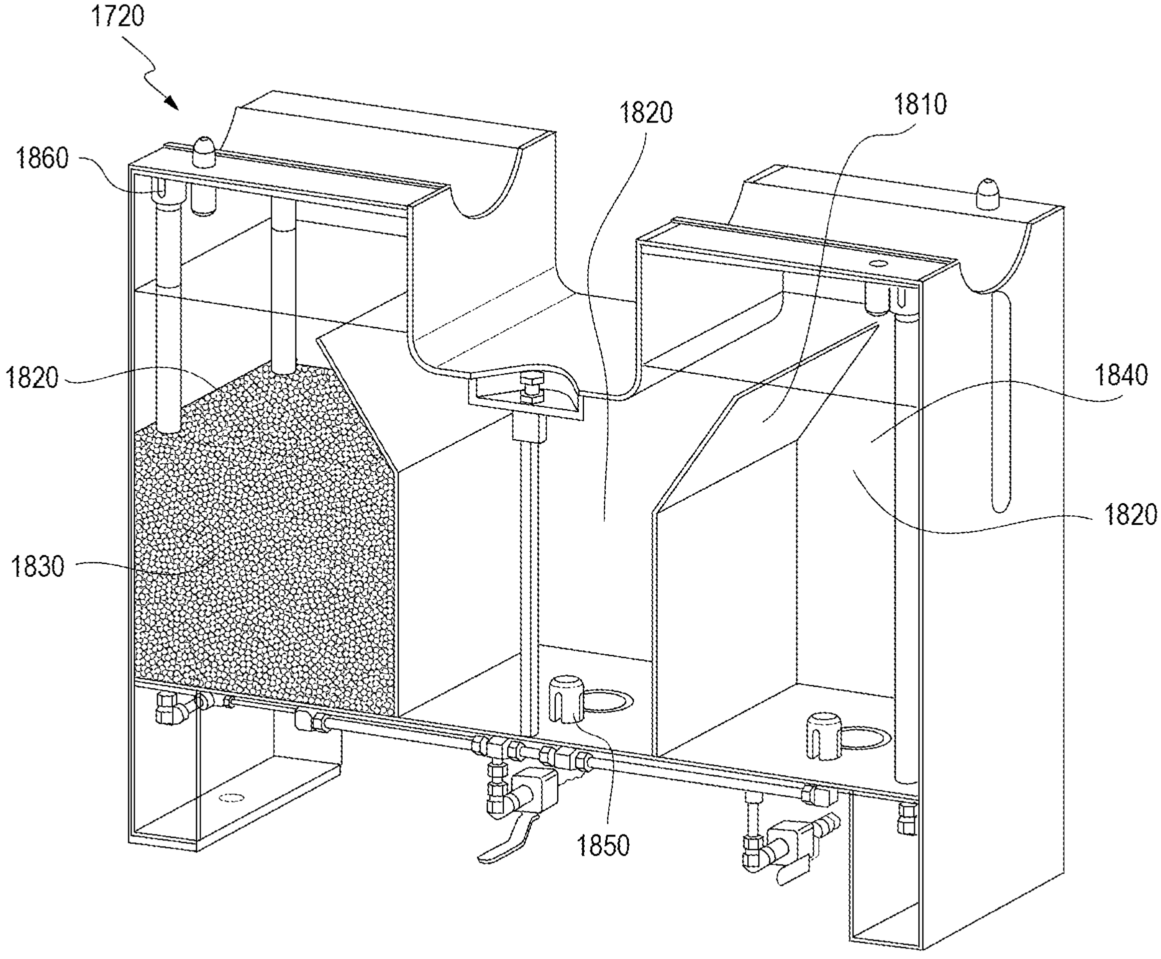
FIG. 18 illustrates a cross-sectional view of a shielding block containers according to an exemplary embodiment.

Referring to FIG. 18, the shielding block containers 1720 can include one or more partitions 1810 that separate an internal space of the block containers 1720 into one or more internal chambers 1820. The internal chambers 1820 can be interconnected via one or more passageways, or the internal chambers 1820 can be isolated from one another.

In an exemplary embodiment, some or all of the internal chambers 1820 can be filled with a mix of radiation-absorbing metal shot 1830 (such as steel balls) and a liquid coolant 1840 (such as water). An inlet 1850 and an outlet 1860 can be provided on the shielding block containers 1720 to facilitate a flow of the liquid coolant 1840. In some embodiments, a port can be provided that functions both as an inlet and/or as an outlet. The combination of the metal shot 1830 and the liquid coolant 1840 can form an efficient shield for both gamma ray and neutron radiation. In an alternate embodiment, the internal chambers 1820 can be filled with carbon steel and concrete, which is also an efficient shield of both gamma ray and neutron radiation. It is to be appreciated that other materials can also be used for shielding purposes.

The local target shielding 190 can include shielding block containers 1720 filled with different shielding materials. By way of example, in an exemplary embodiment, the shielding block containers 1720 proximal to the target holder 150 can be filled with metal shot 1830 and the liquid coolant 1840, whereas the shielding block containers 1720 further away from the target holder 150 can be filled with carbon steel and concrete. In such exemplary embodiment, the shielding block containers 1720 filled with metal shot 1830 and the liquid coolant 1840 can form an inner layer, and the shielding block containers 1720 filled with carbon steel and concrete can form an outer layer of shielding within the local target shielding 190. Specifically, having the shielding block containers 1720 filled with liquid coolant 1840 located closer to the target than the concrete filled shielding block containers 1720 allow the flowing liquid coolant 1840 to remove heat deposited within the shielding block containers 1720 due to radiation.

In an exemplary embodiment, the metal shot 1830 can be steel balls that are roughly ½ inch in diameter. Although FIG. 18 illustrates only having one internal chamber 1820 filled with the metal shot 1830, it is to be appreciated that the other internal chambers 1820 can also include metal shot 1830.

In certain embodiments, the shielding block containers 1720 can be made of materials such as regular concrete, steel, HD concrete, or other radiation blocking (absorbing) materials. In yet another embodiment, the shielding block containers 1720 can be made of a solid concrete or steel block.

Specific embodiments of a method and system for producing molybdenum-99 according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A system for producing radioisotopes comprising:

a first radiation zone designed to house a first electron accelerator configured to engage a first beamline designed to accept a first electron beam extending along a first axis from the first accelerator;

a second radiation zone designed to house a second electron accelerator configured to engage a second beamline designed to accept a second electron beam extending along a second axis from the second accelerator, wherein the first axis and the second axis are parallel; and a third radiation zone designed to house a target assembly configured to house a target isotope to be transmuted into a product isotope;

wherein the first beamline includes a first beamline subsystem configured to bend the first electron beam at a first angle such that the first beamline engages the target assembly from a first direction, wherein the second beamline includes a second beamline subsystem configured to bend the second electron beam at a second angle such that the second beamline engages the target assembly from a second direction that is opposite the first direction.

2. The system of claim 1, wherein the first electron accelerator and the second electron accelerator are continuous wave electron beam accelerators.

3. The system of claim 1, wherein the first electron accelerator and the second electron accelerator are configured to supply 125 kW of average power with 40 MeV electrons.

4. The system of claim 1 further comprising:

a hot cell designed to engage the target assembly; and a target cooling system configured to engage the target assembly.

5. The system of claim 4, wherein the target assembly further comprises a target housing including a first opening, a second opening, and a third opening, wherein the target housing engages a first cooling pipe at the second opening, wherein the target housing engages a second cooling pipe at the third opening, and wherein the first opening, the first cooling pipe, and the second cooling pipe form a trident shape.

6. The system of claim 5, wherein the target cooling system is configured to engage the target assembly through the first cooling pipe and the second cooling pipe, and wherein the first cooling pipe serves as an inlet for a coolant, and the second cooling pipe serves as an outlet for the coolant.

7. The system of claim 6, wherein the coolant is a gaseous coolant.

8. The system of claim 7, wherein the gaseous coolant is helium.

9. The system of claim 6, wherein the coolant is a liquid coolant.

10. The system of claim 5, further comprising a target holder containing the target isotope, wherein the target holder engages the target housing through the first opening.

11. The system of claim 1, wherein the first beamline subsystem is a first achromatic bend system, and wherein the second beamline subsystem is a second achromatic bend system.

12. The system of claim 11, wherein each of the first achromatic bend system and the second achromatic bend system include a pair of 270° magnets.

13. The system of claim 1, wherein each of the first angle and the second angle are equal to 90°.

14. The system of claim 1, wherein the target assembly is encased in a vacuum pipe.

15. The system of claim 14, wherein the vacuum pipe includes a first beamline connection point designed to engage the first beamline and a second beamline connection point designed to engage the second beamline.

16. The system of claim 14, wherein the vacuum pipe is encased in a jacket designed to cool to the vacuum pipe.

17. The system of claim 16, wherein the jacket is cooled by a liquid.

18. The system of claim 1, wherein the target isotope is molybdenum-100 and the product isotope is molybdenum-99; the target isotope is zinc-68 and the product isotope is copper-67; the target isotope is titanium-48 and the product isotope is scandium-47; the target isotope is radium-226 and the product isotope is actinium-225; or the target isotope is osmium-187 and the product isotope is rhenium-186.

* * * * *